United States Patent
Isomura et al.

(10) Patent No.: US 9,487,205 B2
(45) Date of Patent: Nov. 8, 2016

(54) CONTROLLER OF HYBRID SYSTEM

(75) Inventors: Haruo Isomura, Susono (JP); Hiroaki Ebuchi, Hadano (JP); Hiroyuki Shibata, Odawara (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 248 days.

(21) Appl. No.: 14/361,097

(22) PCT Filed: Nov. 29, 2011

(86) PCT No.: PCT/JP2011/077571
§ 371 (c)(1),
(2), (4) Date: May 28, 2014

(87) PCT Pub. No.: WO2013/080306
PCT Pub. Date: Jun. 6, 2013

(65) Prior Publication Data
US 2014/0342871 A1 Nov. 20, 2014

(51) Int. Cl.
*B60W 10/02* (2006.01)
*B60W 10/10* (2012.01)
*B60K 6/48* (2007.10)
*B60K 6/547* (2007.10)
*B60W 30/18* (2012.01)
*F16H 59/16* (2006.01)
*B60W 20/00* (2016.01)
*F16H 3/72* (2006.01)

(52) U.S. Cl.
CPC ............... *B60W 10/02* (2013.01); *B60K 6/48* (2013.01); *B60K 6/547* (2013.01); *B60W 10/10* (2013.01); *B60W 20/00* (2013.01); *B60W 20/10* (2013.01); *B60W 30/18027* (2013.01); *F16H 59/16* (2013.01); *B60W 2510/0657* (2013.01); *F16H 3/725* (2013.01); *Y02T 10/6221* (2013.01); *Y02T 10/7258* (2013.01); *Y10S 903/93* (2013.01); *Y10T 477/26* (2015.01)

(58) Field of Classification Search
CPC .... B60W 10/02; B60W 10/10; B60W 20/10; Y10T 477/26; Y10T 477/675; Y10T 477/688; Y10T 477/655
See application file for complete search history.

(56) References Cited

U.S. PATENT DOCUMENTS

| 2004/0116243 | A1 | 6/2004 | Ibamoto et al. | |
| 2007/0227790 | A1* | 10/2007 | Tanishima | B60K 6/48 180/65.245 |
| 2013/0297136 | A1* | 11/2013 | Yamanaka | B60K 6/48 701/22 |

(Continued)

FOREIGN PATENT DOCUMENTS

| JP | 10-304514 | 11/1998 |
| JP | 2004-190705 A | 7/2004 |

(Continued)

*Primary Examiner* — Huan Le
(74) *Attorney, Agent, or Firm* — Andrews Kurth Kenyon LLP

(57) ABSTRACT

In a controller of a hybrid system including an engine, a motor/generator, an automatic clutch to which engine torque is input, a gear group configured to transmit input torque to a driving wheel side, and a differential device provided with plural rotary elements to which a torque input side of the gear group, a rotating shaft of the motor/generator, and an output side of the automatic clutch are individually connected respectively, wherein at the time a vehicle is started by causing the motor/generator to be in charge of a reaction force of the engine torque and transmitting the engine torque to the driving wheels via the differential device and the gear group, the automatic clutch is slip controlled in a semi-engaged state.

6 Claims, 21 Drawing Sheets

(56) References Cited

U.S. PATENT DOCUMENTS

| | | | | |
|---|---|---|---|---|
| 2014/0180441 A1* | 6/2014 | Hiasa | .................. | B60W 20/10 700/22 |
| 2015/0314777 A1* | 11/2015 | Koike | .................. | B60K 6/442 701/22 |

FOREIGN PATENT DOCUMENTS

| | | |
|---|---|---|
| JP | 2004-270785 A | 9/2004 |
| JP | 2004-293795 A | 10/2004 |
| JP | 2005-278293 A | 10/2005 |
| JP | 2009-036354 A | 2/2009 |

* cited by examiner

CONTROLLER OF HYBRID SYSTEM

CROSS-REFERENCE TO RELATED APPLICATIONS

This is a national phase application based on the PCT International Patent Application No. PCT/JP2011/077571 filed on Nov. 29, 2011, the entire contents of which are incorporated herein by reference.

FIELD

The present invention relates to a controller of a hybrid system having an engine, a motor, an automatic clutch to which output torque of the engine is input, a gear group configured to transmit input torque to driving wheel sides, and a differential device provided with plural rotary elements to which torque input side of the gear group, a rotating shaft of the motor, and a torque output side of the automatic clutch are individually connected, respectively.

BACKGROUND

Conventionally, in this type of the hybrid system, also known is a hybrid system further including a so-called automatic control manual transmission between an output side of an automatic clutch and driving wheel sides. An input shaft of the manual transmission is coupled with a rotary element of a differential device on the same side as an output side of the automatic clutch. The hybrid system can start a vehicle by transmitting output torque of an engine to driving wheels via the differential device and a gear group so that a reaction force of output torque of the engine is caused to be in charge of a motor at the time of the vehicle start. Further, the hybrid system transmits the output torque of the engine to the driving wheels via the differential device and the gear group by causing the motor to be in charge of a reaction force of the output torque of the engine in a gear shift process between gear shift stages in a transmission. For example, the hybrid system having the configuration is disclosed in Patent Literature 1 described below.

Note that Patent Literatures 2 and 3 described below disclose hybrid systems each having an engine, a motor, an automatic control manual transmission interposed between the engine and driving wheels, a gear group for transmitting input torque to the driving wheel sides, and a differential device provided with plural rotary elements to which a torque input side of the gear group, a rotating shaft of the motor, an output shaft side of the engine, and an input shaft side of a transmission are individually connected, respectively. The hybrid systems carry out a smooth gear shift control with good responsiveness without depending on a friction control of an automatic clutch by carrying out a torque transition at the time of gear shift by the torque generated by the motor and a rotation number transition at an inertia phase by a rotation number control of the motor. Thus, the hybrid systems described in Patent Literatures 2 and 3 are not provided with the automatic clutch having one engagement member connected to an output shaft of the engine and the other engagement member connected to the rotary elements of the differential device. Further, Patent Literature 4 shown below discloses a technology for more increasing target torque of a motor that is power running driven when a charge state of a rechargeable battery is higher in a parallel hybrid system.

CITATION LIST

Patent Literature

Patent Literature 1: Japanese Patent Application Laid-open No. 2009-036354
Patent Literature 2: Japanese Patent Application Laid-open No. 2004-293795
Patent Literature 3: Japanese Patent Application Laid-open No. 2004-190705
Patent Literature 4: Japanese Patent Application Laid-open No. 2005-278293

SUMMARY

Technical Problem

Incidentally, in the conventional hybrid systems, as described above, the reaction force of the output torque of the engine is in charge of the motor at the time of vehicle start (also at the time of gear shift). Thus, in the hybrid systems, an output of a rechargeable battery must be increased as the reaction force increases (namely, as the output torque of the engine increases).

Accordingly, an object of the present invention is to provide a controller of a hybrid system which can improve the disadvantages of the conventional examples and can reduce an output of a rechargeable battery at the time of vehicle start.

Solution to Problem

In order to achieve the above mentioned object, a controller of a hybrid system according to the present invention includes an engine; a motor/generator; an automatic clutch to which output torque of the engine is input; a gear group configured to transmit input torque to a driving wheel side; and a differential device provided with a plurality of rotary elements to which a torque input side of the gear group, a rotating shaft of the motor/generator, and an output side of the automatic clutch are individually connected, respectively, wherein at the time a vehicle is started by causing the motor/generator to be in charge of a reaction force of output torque of the engine and transmitting the output torque of the engine to driving wheels via the differential device and the gear group, the automatic clutch is slip controlled in a semi-engaged state.

Here, it is desirable that at the time a charge prohibition condition of a rechargeable battery is established, the vehicle is started by transmitting the output torque of the engine and output torque of the motor/generator during the motor/generator is power running driven to the driving wheels while the automatic clutch is slip controlled in the semi-engaged state.

Further, it is desirable that a start control, which is carried out using the differential device and the gear group as a power transmission path while controlling slip of the automatic clutch, is carried out at the time a discharge prohibition condition of the rechargeable battery is established, whereas at the time the charge prohibition condition of the rechargeable battery is established, the vehicle is desirably started by transmitting the output torque of the engine and the output torque of the motor/generator during the motor/generator is power running driven to the driving wheels while controlling slip of the automatic clutch in the semi-engaged state, and further, at the time neither the charge prohibition condition nor the discharge prohibition condition of the rechargeable battery is established and the rechargeable battery can be charged and discharged, a load of the automatic clutch in the start control during the charge prohibition condition is established is compared with a load of the automatic clutch in the start control at the time the discharge prohibition condition is established, and a start control in which the load is smaller is desirably carried out.

Further, it is desirable that at the time a gear shift stage of a main-transmission having an input shaft coupled with an output side of the automatic clutch and an output shaft coupled with the driving wheel side is switched, a power transmission path is switched from a gear shift stage before shifting gears of the main-transmission to a gear pair for shifting gears in the gear group by causing the motor/generator to be in charge of the reaction force of the output torque of the engine, and at the time a gear shift is carried out by connecting the main-transmission to a requested gear shift stage after the main-transmission has been controlled to a neutral state and a rotation number of the engine has been controlled by a rotation number control of the motor/generator, if an output of the motor/generator exceeds an output restriction of the rechargeable battery, a higher rotation number of the motor/generator desirably more reduces the output torque of the engine.

Advantageous Effects of Invention

The controller of the hybrid system according to the present invention makes a rotation number difference of the engine side and the gear group side of the differential device by causing the motor/generator to be in charge of the reaction force of the output torque of the engine, and further makes the rotation number difference also between the engine side and the differential device side in the automatic clutch by semi-engaging the automatic clutch. Thus, in the hybrid system, when the vehicle is started, a difference of rotation number of the driving wheels and the engine can be absorbed by the respective rotation number differences. With the operation, in the hybrid system, when the vehicle is started, since the rotation number of the rotary element on the engine side of the differential device can be reduced and the rotation number of the rotary element on the motor/generator side of the differential device can be also reduced thereby, an output of the rechargeable battery can be more reduced than absorbing the difference of the rotation numbers of the driving wheels and the engine by the rotation number difference of the engine side and the sub-transmission side of the differential device.

DESCRIPTION OF EMBODIMENTS

Hereinafter, an embodiment of a controller of a hybrid system according to the present invention will be explained below in detail based on the drawings. The hybrid system as an object to which the controller according to the present invention is applied has an engine, a motor, an automatic clutch to which output torque of the engine is input, a gear group for transmitting input torque to driving wheel sides and a differential device having plural rotary elements to which a torque input side of the gear group, a rotating shaft of the motor, and an output side of the automatic clutch are individually connected, respectively and transmits the output torque of the engine to the driving wheels via the differential device and the gear group by causing the motor to be in charge of a reaction force of the output torque of the engine at the time of vehicle start and at the time of shifting gears. The present invention is not restricted by the embodiment.

Embodiment

An embodiment of a controller of a hybrid system according to the present invention will be explained based on FIG. 1 to FIG. 24.

Figure 1:
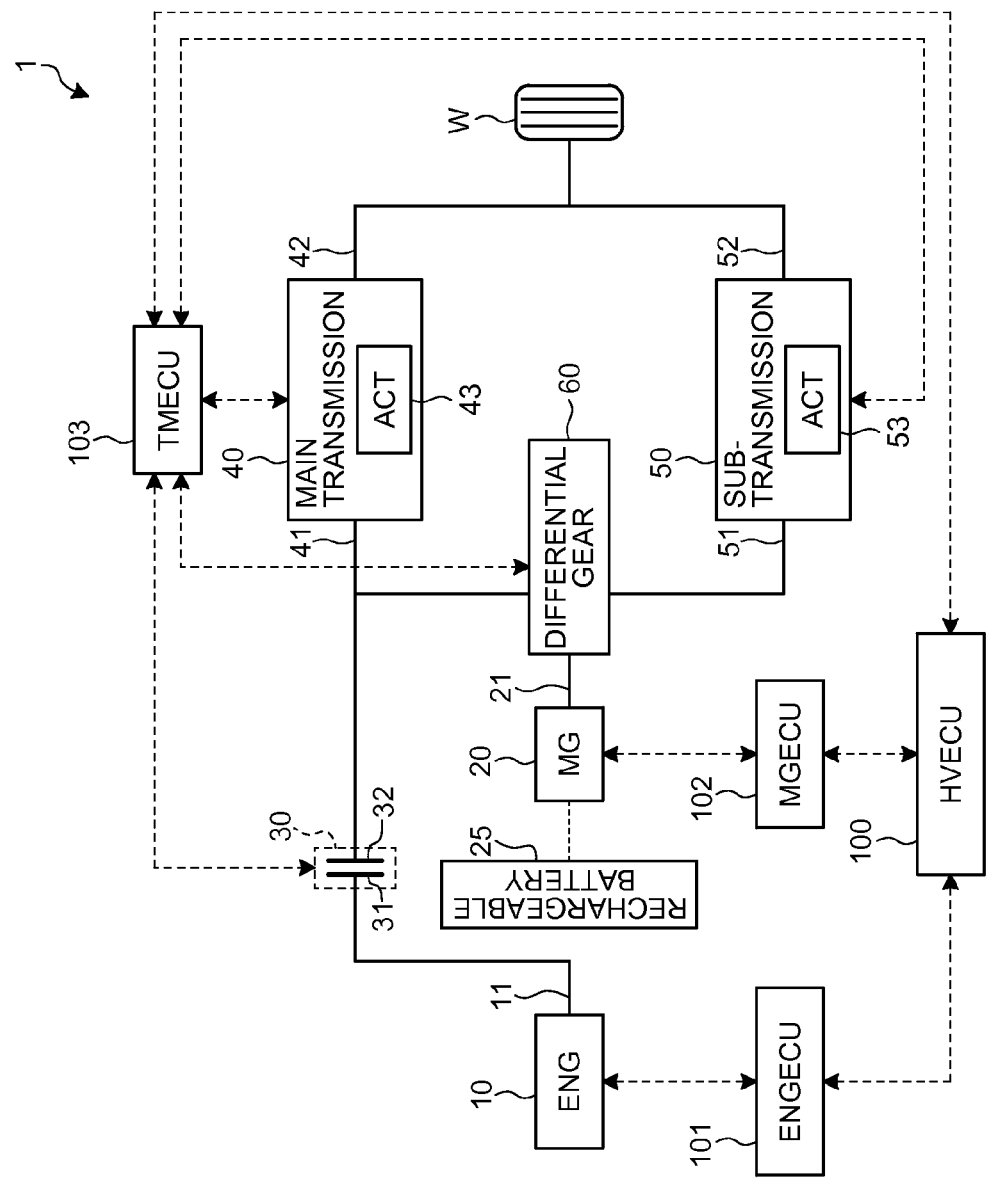
FIG. 1 is a view illustrating a controller of a hybrid system according to the present invention and the hybrid system as an object to which the controller is applied.

A reference numeral 1 of FIG. 1 illustrates the hybrid system of the embodiment.

The hybrid system 1 includes a mechanical power source and an electric power source. The mechanical power source is an engine 10 such as an internal combustion engine or an external combustion engine for outputting mechanical power (engine torque) from an output shaft (crank shaft) 11. An operation of the engine 10 is controlled by an engine control electronic controller (hereinafter, called "engine ECU (ENGECU)" 101). Further, the electric power source is a motor, a generator capable of carrying out a power-running drive, and a motor/generator capable of carrying out both the power running and regeneration. Here, the motor/generator 20 will be explained as an example. The motor/generator 20 functions as a motor (electric motor) at the time of power running drive, converts electric energy supplied from a rechargeable battery 25 to mechanical energy, and outputs mechanical power (motor torque) from a rotating shaft 21. In contrast, at the time of regenerative drive, the motor/generator 20 functions as a generator (a power generator), converts mechanical energy to electric energy when mechanical power (motor torque) is input from a differential device 60 to be described later to the rotating shaft 21 and stores the electric energy in the rechargeable battery 25 as electric power. The motor/generator 20 is controlled by a motor/generator controlling electronic controller (hereinafter, called "MGECU") 102.

Further, the hybrid system 1 includes an automatic clutch 30 to which engine torque is input. In the automatic clutch 30, an engagement member 31 on a torque (engine torque) input side is coupled with the output shaft 11 side of the engine 10 and an engagement member 32 on a torque output side is coupled with an input shaft 41 of a transmission 40 to be described below. The automatic clutch 30 is a friction clutch for creating a released state, a completely engaged state, or a semi-engaged state by controlling spaces among the respective engagement members 31, 32 on a torque input side and a torque output side. The released state is a state in which the respective engagement members 31, 32 are not in contact with each other and no torque is transmitted between the torque input side and the torque output side. In contrast, the completely engaged state and the semi-engaged state are a state in which the respective engagement members 31, 32 are in contact with each other and torque can be transmitted between the torque input side and the torque output side. Among them, the completely engaged state is a state in which the respective engagement members 31, 32 are integrally rotated at the same rotation number. The semi-engaged state is a state in which the respective engagement members 31, 32 are rotated while being slipped each other and shows an engaged state in a transitional period between the released state and the completely engaged state.

The automatic clutch 30 can transmit the engine torque to the input shaft 41 of the transmission 40 in the completely engaged state or in the semi-engaged state. Further, the input shaft 41 of the transmission 40 exemplified here is coupled also with the rotating shaft 21 of the motor/generator 20 via the differential device 60, and when the transmission (main-transmission) 40 and a mesh clutch of a sub-transmission 50 to be described below are engaged together, the motor torque at the time of power running drive can be transmitted to an output shaft 42. In the transmission 40, the engine torque and the motor torque are output from the output shaft 42 and transmitted to driving wheel W sides.

The transmission 40 is a so-called automatic control type automatic transmission in which an engagement and release control of the automatic clutch 30 for connecting a space to the engine 10 is carried out by a gear shift controlling electronic controller (hereinafter, called "gear shift ECU (TMECU)") 103. For example, although the transmission 40 has the same configuration as an ordinary manual transmission (a gear pair according to a gear shift stage, plural mesh clutches, and plural sleeves), the transmission 40 includes an actuator 43 for moving the sleeves. When the gear shift ECU 103 detects a target gear shift stage, the gear shift ECU 103 appropriately moves a sleeve according to the target gear shift stage by the actuator 43 and changes a speed to the target gear shift stage by completely engaging or releasing the respective mesh clutches according to the target gear shift stage. Further, the gear shift ECU 103 places the transmission 40 in a neutral state by controlling the actuator 43 and moving the sleeves to release the respective mesh clutches. The gear pair according to a gear shift stage has a gear on one hand attached to the input shaft 41 and a gear on the other hand attached to the output shaft 42 and meshed with the gear on the one hand.

Further, the hybrid system 1 is provided with a gear group 50 used at the time of vehicle start. The gear group 50 includes a gear on a torque input side where the engine torque and the motor torque are input via an input shaft 51 and a gear on a torque output side which is meshed with the above gear and where torque is transmitted to the driving wheel W sides via an output shaft 52. In the hybrid system 1, the input shaft 51 is coupled with the engine 10 and the motor/generator 20 via the differential device 60 and the output shaft 52 is coupled with the driving wheel W sides.

The gear group 50 may be configured as a gear pair composed of a gear on the torque input side and a gear on the torque output side or may be configured as a gear group having plural sets of the gear pairs each composed of two gears on the torque input side and on the torque output side.

When the gear group 50 is composed of the gear pair as in the former case, the gear pair is configured as a gear pair corresponding to a vehicle start gear shift stage of the transmission 40. For example, a gear ratio of the gear pair is set to the same gear ratio as the vehicle start gear shift stage of the transmission 40 or to a gear ratio near to the gear ratio. Thus, it is sufficient to set the gear group 50 in the case to, for example, a gear pair having the same gear ratio as the first gear speed of the transmission 40.

In contrast, when the gear group 50 is composed of the plural gear pairs as in the latter case, a gear pair corresponding to at least the vehicle start gear shift stage of the transmission 40 is provided. For example, in the case, a gear pair at least having the same gear ratio as the first gear speed of the transmission 40 is provided likewise the former case. Further, on a low μ road, for example, on an ice and snow road, a driver may select to start at a second gear speed. Because of the reason, the latter gear group 50 may be provided with a gear pair having the same gear ratio as the second gear speed of the transmission 40 in addition to the gear pair having the same gear ratio as the first gear speed of the transmission 40. Further, it is also possible to use the gear group 50 not only at the time of vehicle start but also at the time of gear shift operation of the transmission 40. Thus, the latter gear group 50 may be provided with a gear pair having a gear ratio that can be used at the time of gear shift operation between gear shift stages in addition to the gear pair corresponding to the vehicle start gear shift stage of the transmission 40. The following explanation will be made exemplifying the gear group 50 provided with the latter plural sets of the gear pairs.

The latter gear group 50 is called the sub-transmission 50. Thus, the transmission 40 described above is called the main transmission 40 to discriminate it from the sub-transmission 50. Further, a gear shift stage of the main transmission 40 is called a main gear shift stage and a gear shift stage of the sub-transmission 50 is called a sub-gear shift stage.

The sub-transmission 50 exemplified here includes a vehicle start sub-gear shift stage having the same gear ratio as the first gear speed of the main transmission 40 and plural gear shift sub-gear shift stages according to the number of main gear shift stages of the main transmission 40. A gear ratio of the gear shift sub-gear shift stages is determined by a gear ratio of the main gear shift stage and a structure of the differential device 60. Hereinafter, the gear ratio of the sub-gear shift stage when a speed is changed between, for example, the first gear speed and the second gear speed of the main transmission 40 is called a 1.5 gear speed. A gear pair according to the vehicle start and gear shift sub-gear shift stages includes a gear on one hand attached to the input shaft 51 and a gear on the other hand attached to the output shaft 52 and meshed with the gear on the one hand.

The sub-transmission 50 has the same structure as the main transmission 40 and includes an actuator 53 for moving sleeves. The gear shift ECU 103 sets a target sub-gear shift stage at the time of vehicle start or at the time of gear shift operation of the transmission 40, appropriately moves a sleeve according to the target sub-gear shift stage by the actuator 53, and changes a speed to the target sub-gear shift stage by completely engaging or releasing the respective mesh clutches according to the target sub-gear shift stage.

In the sub-transmission 50 configured as described above, the output shaft 52 may be coupled with the output shaft 42 of the main transmission 40 or may be commonly used with the output shaft 42. Further, in the latter case, not only the output shafts 42, 52 are commonly used but also the other gear of the main transmission 40 and the other gear of the sub-transmission 50 may be commonly used.

The differential device 60 includes plural rotary elements engaged with each other and a differential action is carried out between the respective rotary elements. The differential device 60 of the hybrid system 1 includes at least a first rotary element coupled with the rotating shaft 21 of the motor/generator 20, a second rotary element coupled with the input shaft 51 side of the sub-transmission 50, and a third rotary element coupled with a torque output side of the automatic clutch 30 (the engagement member 32) and the input shaft 41 side of the main transmission 40. As a specific example, the differential device 60 includes a so-called planetary gear structure. For example, when the differential device 60 includes a single pinion type planetary gear structure, a sun gear is configured as the first rotary element, a ring gear is configured as the second rotary element, and a carrier is configured as the third rotary element.

The hybrid system 1 is provided with an integrated ECU (hereinafter, called "HVECU") 100 for integrally controlling an engine ECU 101, an MGECU 102, and a gear shift ECU 103, and a controller is configured thereby.

Incidentally, the hybrid system 1 can start the vehicle by controlling the main transmission 40 to the neutral state and transmitting the engine torque to the driving wheels W via the differential device 60 and the sub-transmission 50. Because of the reason, when the vehicle is started, the controller of the hybrid system 1 carries out a control of the main transmission 40 to the neutral state and a gear shift control of the sub-transmission 50 to the vehicle start sub-gear shift stage (the first gear speed).

At the time of vehicle start, a vehicle speed becomes 0 or a low speed and a rotation number of the driving wheels W becomes 0 or a low rotation number. In contrast, to start the vehicle, unless an engine rotation number is at least an idling rotation number or more, torque sufficient to start the vehicle cannot be generated to the driving wheels W. Thus, when the vehicle is started, it is necessary to absorb a rotation number difference between the driving wheels W and the engine 10.

In the hybrid system 1, the rotation number difference of the driving wheels W and the engine 10 can be absorbed as described below. When, for example, the vehicle is started, it is sufficient to make the rotation number difference between the carrier and the ring gear of the differential device 60 by completely engaging the automatic clutch 30, rotating a front side and a rear side (the torque input side and the torque output side) of the automatic clutch 30 and the carrier of the differential device 60 at the engine rotation number, and causing the motor/generator 20 to be in charge of a reaction force of the engine torque. Namely, the rotation number difference of the driving wheels W and the engine 10 is absorbed by the rotation number difference of the carrier and the ring gear in the differential device 60 (a difference between the engine rotation number and a rotation number of the input shaft 51 of the sub-transmission 50). In the hybrid system 1, when the vehicle speed increases up to a vehicle speed at which travelling via the main transmission 40 can be carried out, a control is carried out by connecting the main gear shift stage of the main transmission 40 to the first gear speed so that the motor/generator 20 is not caused to be in charge of the reaction force of the engine torque and that the engine torque is transmitted to the driving wheels W only via the main transmission 40.

Figure 2:
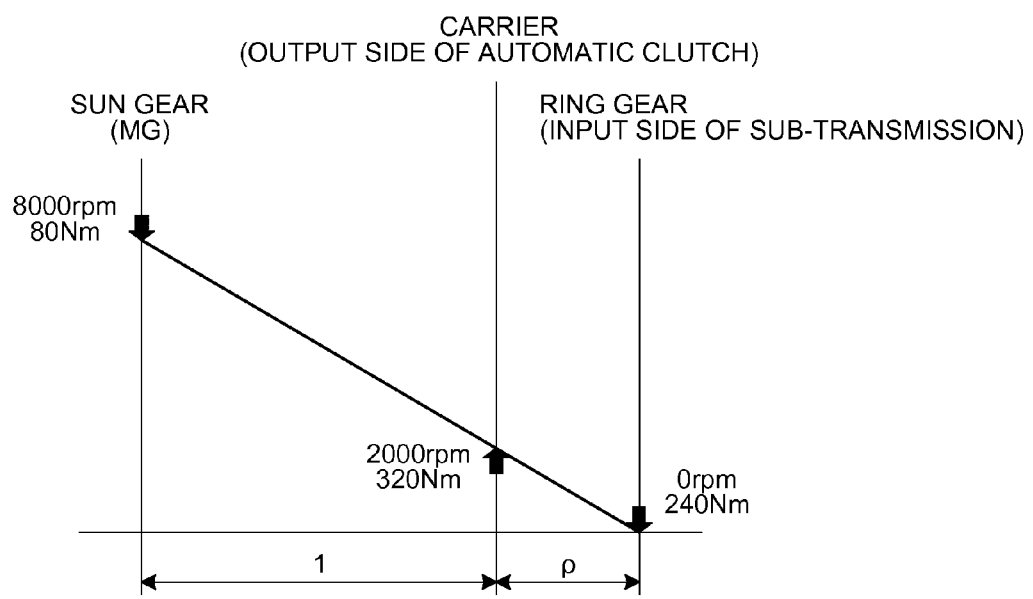
FIG. 2 is a collinear diagram of a differential device in the hybrid system of an embodiment and is a view illustrating the time when conventional vehicle starts.

As the specific example, when 6000 Nm of torque is necessary to the driving wheels W at 0 rpm in order to start the vehicle, the input shaft 51 of the sub-transmission 50 and the ring gear of the differential device 60 need to generate 240 Nm of torque at 0 rpm when it is assumed that a gear ratio of the first gear speed of the sub-transmission 50 to start the vehicle is 25 (FIG. 2). When it is assumed that a gear ratio ρ of the differential device 60 (=number of teeth of sun gear/number of teeth of ring gear) is set to ⅓, torque (=engine torque) required by the carrier of the differential device 60 is 320 Nm and torque (motor torque) required by the sun gear of the differential device 60 is 80 Nm. When it is assumed that the engine rotation number necessary for the engine 10 to output 320 Nm of engine torque is 2000 rpm, a rotation number of the carrier becomes also 2000 rpm when the engine torque is output, and a rotation number of the motor/generator 20 becomes 8000 rpm. Thus, in the vehicle start control mode, since an output (electric power)

regenerated by the motor/generator 20 becomes about 67 kW (=8000 rpm×80 Nm×2π÷1000÷60), when, for example, the output of the rechargeable battery 25, which is preferable from a view point of fuel economy, is 30 kW, it is necessary to increase the output of the rechargeable battery 25 by 37 kW (=67 kW−30 kW) to start the vehicle. Thus, when the vehicle start control mode is embodied, the rechargeable battery 25, which has an output restriction determined by a temperature, etc., of the rechargeable battery 25 and a large capacity, must be prepared, which results in an increase of cost.

In the hybrid system 1 of the embodiment, when the vehicle is started, the rotation number difference is generated between the engine 10 side and the sub-transmission 50 side of the differential device 60 (that is, between the carrier and the ring gear) by causing the motor/generator 20 to be in charge of the reaction force of the engine torque (that is, by the outputs of the motor/generator 20 and the rechargeable battery 25) and further the automatic clutch 30 is placed in the semi-engaged state by being slip controlled, and the rotation number difference is generated also between the engine 10 side and the differential device 60 side of the automatic clutch 30 (that is, the rotation number difference is made also between the engine rotation number and the rotation number of the carrier of the differential device 60), thereby the rotation number difference of the driving wheels W and the engine 10 is absorbed. Namely, in the hybrid system 1, the rotation number difference of the front side and the rear side of the automatic clutch 30 and the rotation number difference between the engine 10 side and the sub-transmission 50 side of the differential device 60 are made and the vehicle is started using the engine torque as power. Thus, when the rotation number difference of the driving wheels W and the engine 10 is absorbed, the controller controls the motor/generator 20 so that it is caused to be in charge of the reaction force of the engine torque, generates the rotation number difference between the engine 10 side and the sub-transmission 50 side in the differential device 60 by slip controlling the automatic clutch 30 and generates the rotation number difference between the engine 10 side and the differential device 60 side in the automatic clutch 30. Hereinafter, the vehicle start is called also "an engine start using the rotation number difference between the automatic clutch 30 and the differential device 60".

At the time, the controller determines a requested rotation number (a requested motor rotation number) of the motor/generator 20 which allows to output requested motor torque based on the requested motor torque necessary to start the vehicle and on the output of the rechargeable battery 25 which is preferable from a view point of fuel economy (=an output (electric power) regenerated by the motor/generator 20). Further, the controller determines a requested rotation number of the carrier of the differential device 60 at the time (a requested rotation number of the engagement member 32 on the torque output side of the automatic clutch 30) based on the requested motor rotation number and on the gear ratio ρ of the differential device 60. Further, the controller determines the requested rotation number difference of the front side and the rear side of the automatic clutch 30, i.e., the difference of the requested rotation number of the engagement member 32 and the requested rotation number of the other engagement member 31. The requested rotation number of the engagement member 31 is determined according to the requested engine rotation number for generating requested engine torque necessary to start the vehicle. Here, the requested engine rotation number becomes the requested rotation number of the engagement member 31. The controller slip controls the automatic clutch 30 in the semi-engaged state to generate the requested rotation number difference and controls the motor/generator 20 by the requested motor rotation number, thereby causing the motor/generator 20 to be in charge of the reaction force of the engine torque. With the operation, in the hybrid system 1, the rotation number difference of the driving wheels W and the engine 10 is absorbed so that the vehicle can be started.

Figure 3:
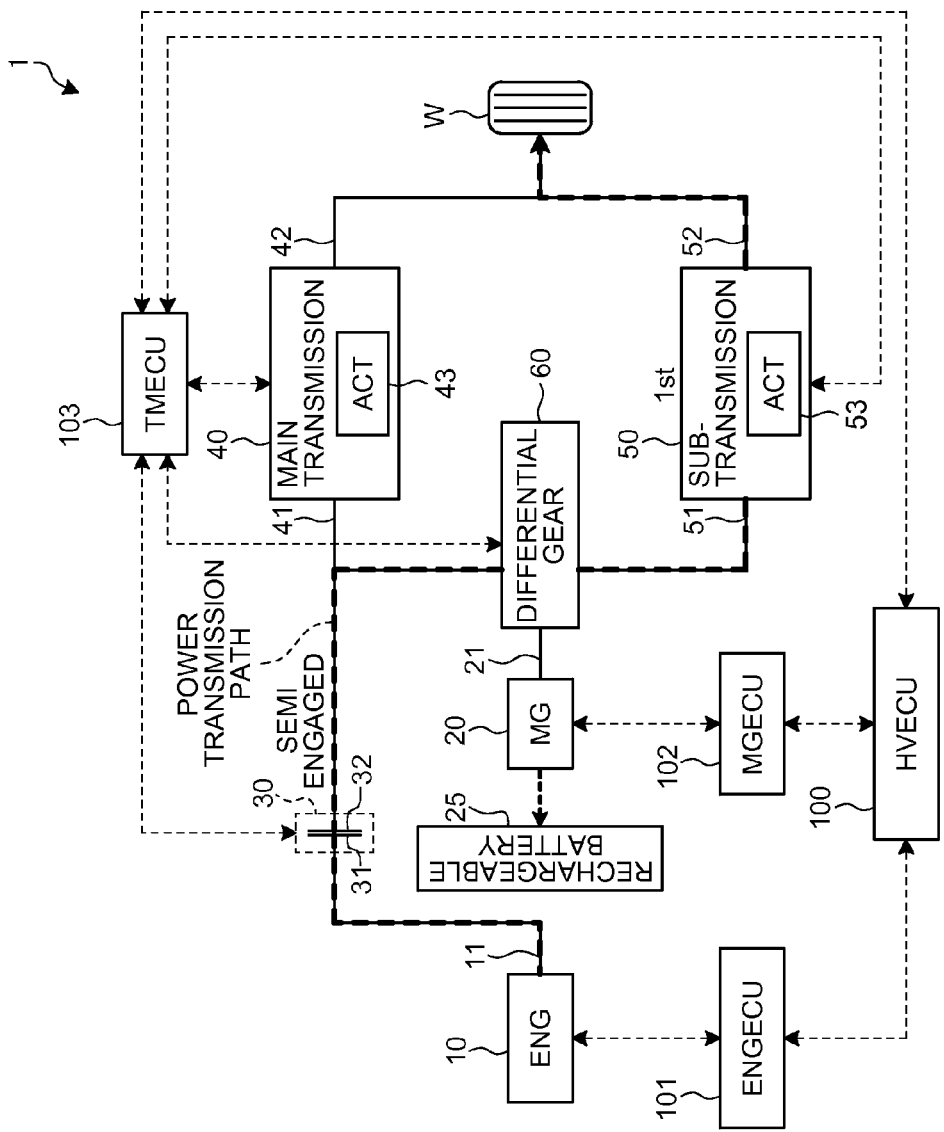
FIG. 3 is a view illustrating a power transmission path when a vehicle of the embodiment starts.

At the time, as described above, the control of the main transmission 40 to the neutral state and the gear shift control of the sub-transmission 50 to the vehicle start sub-gear shift stage (the first gear speed) are carried out. Thus, the power (engine torque) when the vehicle is started is transmitted to the driving wheels W via the automatic clutch 30, the differential device 60, and the sub-transmission 50 (FIG. 3).

A specific example of the case will be explained. To compare the specific example with the conventional specific example described previously, 6000 Nm of torque of the driving wheels W is necessary at 0 rpm to start the vehicle, and the gear ratio of the sub-gear shift stage of the sub-transmission 50 for starting the vehicle is set to 25 and the gear ratio ρ of the differential device 60 is set to ⅓. Further, to start the vehicle, 320 Nm of the requested engine torque (generated at 2000 rpm of the requested engine rotation number) and 80 Nm of the requested motor torque (the requested torque of the sun gear of the differential device 60) are necessary.

Figure 4:
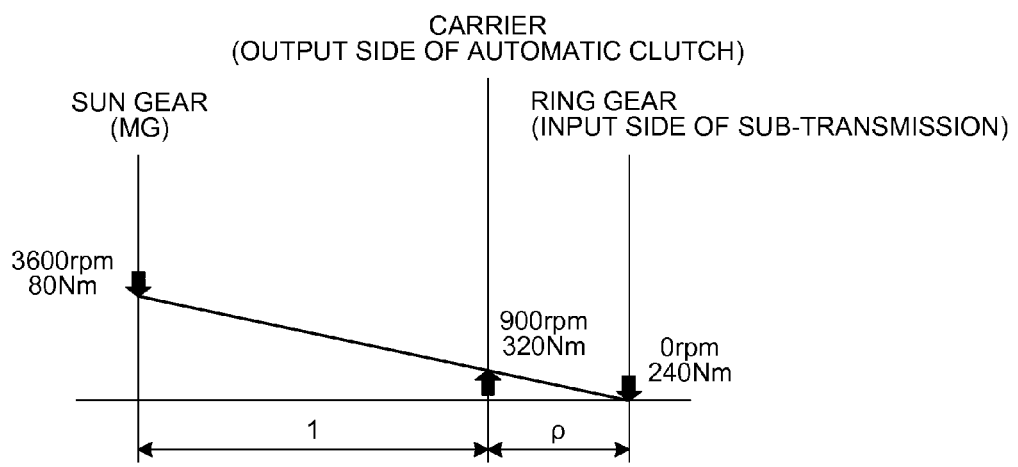
FIG. 4 is a collinear diagram of the differential device when the vehicle of the embodiment starts.

When it is assumed that the output of the rechargeable battery 25, which is preferable from a view point of fuel economy (=the output (electric power) regenerated by the motor/generator 20), is 30 kW to the previous specific example, the requested motor rotation number which can allow 80 Nm of the requested motor torque becomes about 3600 rpm (=30 kW×1000×60÷2π÷80 Nm) (FIG. 4). Namely, the requested motor rotation number is determined by the output of the rechargeable battery 25 (the output of the motor/generator 20) and the requested motor torque. Thus, when the motor/generator 20 is rotated by the requested motor rotation number, the requested rotation number of the carrier of the differential device 60 (the requested rotation number of the engagement member 32) becomes 900 rpm. As a result, it can be found that, in the hybrid system 1, the rotation number difference (=1100 rpm) of the requested engine rotation number (=2000 rpm) and the requested rotation number of the engagement member 32 (=900 rpm) is made between the front side and the rear side of the automatic clutch 30 (between the engagement member 31 and the engagement member 32) with a result that the rotation number difference of the driving wheels W and the engine 10 is absorbed. Thus, the controller slip controls the automatic clutch 30 in the semi-engaged state to generate the requested rotation number difference (=1100 rpm), controls the motor/generator 20 to the requested motor rotation number (=3600 rpm), and causes the motor/generator 20 to be in charge of the reaction force of the engine torque. In the hybrid system 1, starting the vehicle as described above can reduce the output of the rechargeable battery 25 by 37 kW (=67 kW−30 kW) in comparison with the previous specific example. The hybrid system 1 can reduce the output of the rechargeable battery 25 by 37 kW (=67 kW−30 kW) in comparison with the previous specific example.

Since the output of the rechargeable battery 25 (strictly, an input/output ratio Win/Wout) is changed by receiving a restriction of temperature and output time of the rechargeable battery 25, it is preferable to change the ratio of the rotation number difference in the automatic clutch 30 and the rotation number difference of the carrier (the engine 10 side)

and the ring gear (the input shaft 51 side of the sub-transmission 50) in the differential device 60 to the above change.

Figure 5:
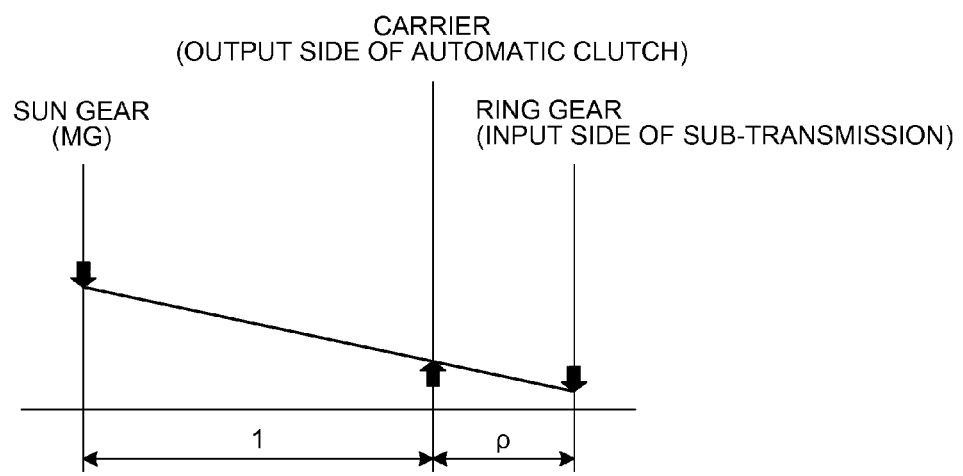
FIG. 5 is a collinear diagram of the differential device at the time of vehicle start in the embodiment.
Figure 6:
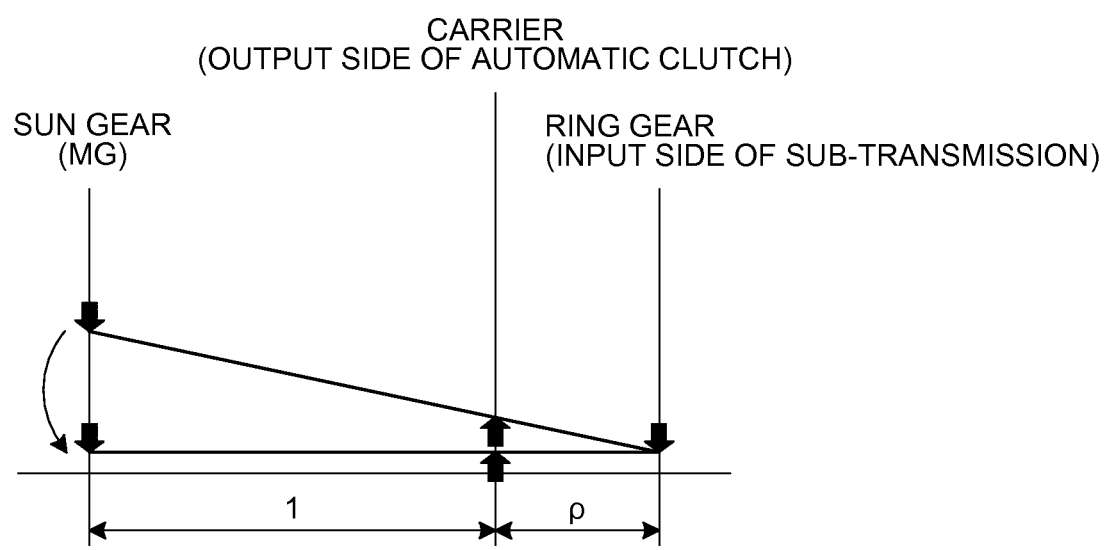
FIG. 6 is a collinear diagram of the differential device when the power transmission path is switched to a vehicle start main gear shift stage in the hybrid system of the embodiment.
Figure 7:
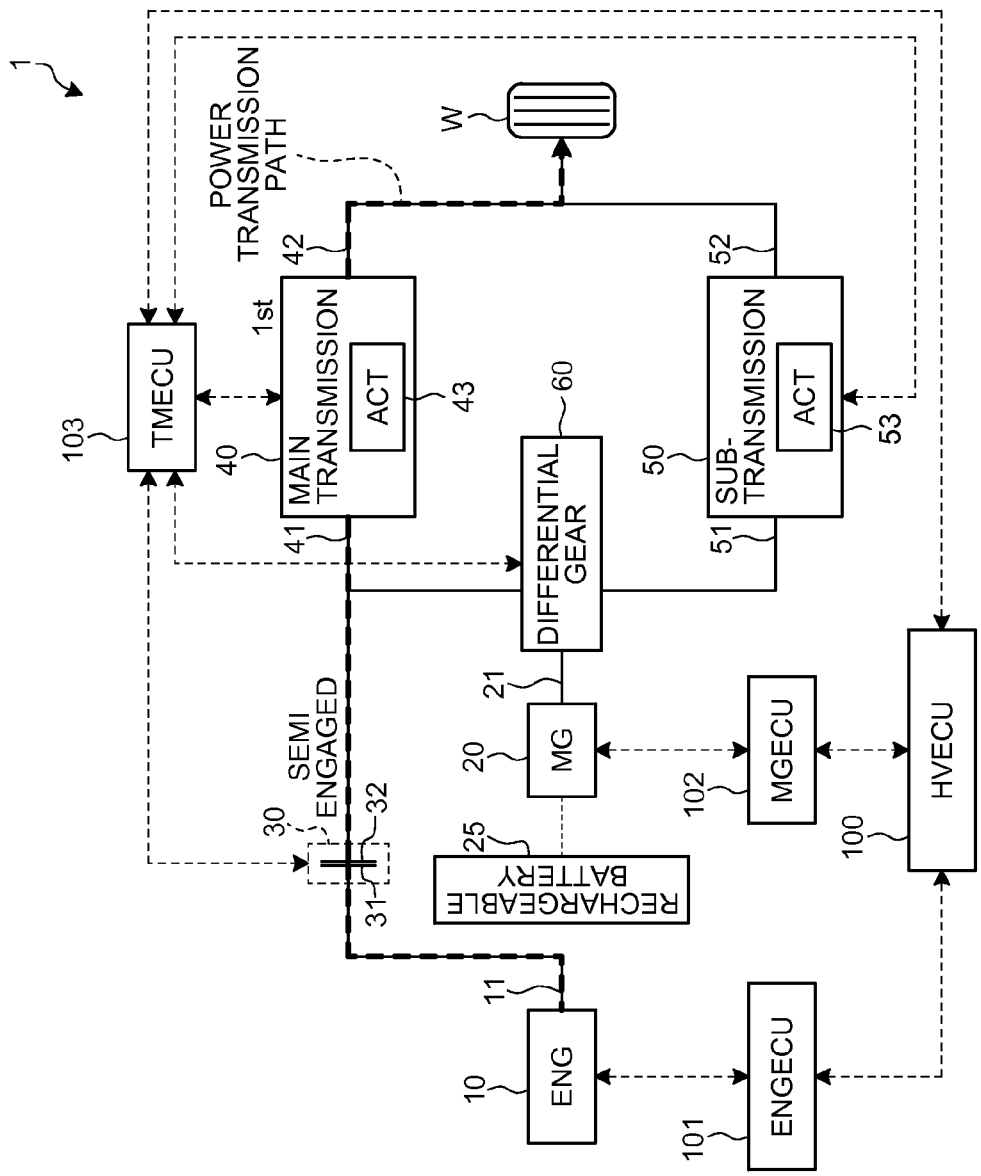
FIG. 7 is a view when the power transmission path is switched to the vehicle start main gear shift stage when the vehicle of the embodiment starts.

In the hybrid system 1, as the vehicle starts, the rotation number of the driving wheels W, that is, the rotation number of the input shaft 51 of the sub-transmission 50 and the ring gear of the differential device 60 increases (FIG. 5). Thereafter, to smoothly switch the vehicle start sub-gear shift stage (the first gear speed) of the sub-transmission 50 to the vehicle start main gear shift stage (the first gear speed) of the main transmission 40, the controller reduces the rotation number of the input shaft 41 of the main transmission 40, that is, the rotation numbers of the engagement member 32 on the torque output side of the automatic clutch 30 and the carrier of the differential device 60 by reducing a motor rotation number. Here, to connect the sub-gear shift stage (the first gear speed) to the vehicle start main gear shift stage (the first gear speed) while suppressing shock, the controller reduces the rotation number of the carrier of the differential device 60 down to the rotation number of the ring gear (FIG. 6). After the synchronous control of the rotation number has been carried out, the controller connects the main transmission 40 to the vehicle start main gear shift stage (the first gear speed) and controls the motor/generator 20 so that it is not caused to be in charge of the reaction force of the engine torque. With the operation, in the hybrid system 1, a power transmission path from the engine 10 to the driving wheels W becomes only a power transmission path via the main transmission 40 (FIG. 7).

As shown above, when the vehicle is started, the controller of the hybrid system 1 makes the rotation number difference of the rotary element on the engine 10 side and the rotary element on the sub-transmission 50 side in the differential device 60 by causing the motor/generator 20 to be in charge of the reaction force of the engine torque and makes also the rotation number difference of the engine rotation number and the engine 10 side of the differential device 60 by controlling the automatic clutch 30 to the semi-engaged state, thereby absorbing the rotation number difference of the driving wheels W and the engine 10. Because of the reason, in the hybrid system 1, since the rotation number of the rotary element on the engine 10 side of the differential device 60 can be reduced and the rotation number of the rotary element on the motor/generator 20 side of the differential device 60 is also reduced thereby, the output of the rechargeable battery 25 can be reduced rather than absorbing the rotation number difference of the driving wheels W and the engine 10 by the rotation number difference of the engine 10 side and the sub-transmission 50 side of the differential device 60. Thus, according to the hybrid system 1, since the output of the rechargeable battery 25 is reduced when the vehicle is started, an increase of the capacity of the rechargeable battery 25 can be suppressed so that the increase of cost of the system can be suppressed. In the hybrid system 1, since the rotation number difference of the front side and the rear side of the automatic clutch 30 (between the engagement member 31 and the engagement member 32) can be more reduced than the conventional system in which the rotation number difference of the driving wheels W and the engine 10 is absorbed only by the slip control of the automatic clutch 30, durability of the automatic clutch 30 is improved. Further, since the hybrid system 1 regeneratively drives the motor/generator 20 to cause the motor/generator 20 to be in charge of the reaction force of the engine torque, the rechargeable battery 25 can be charged, and when the rechargeable battery 25 is insufficiently charged, the insufficient charge state can be also avoided.

Figure 8:
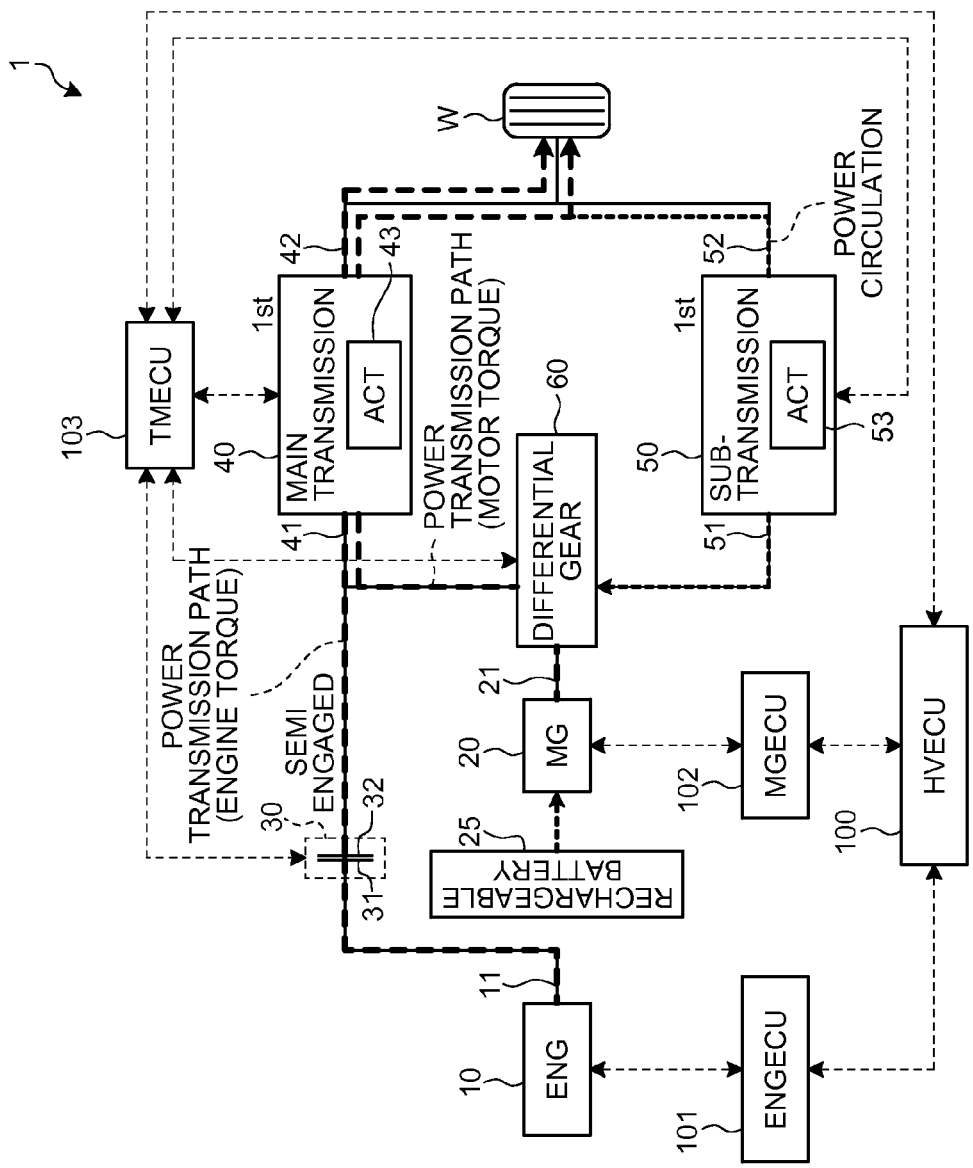
FIG. 8 is a view illustrating the power transmission path of the embodiment in which motor torque is added as assist torque when the vehicle starts after the power transmission path has been switched to the main gear shift stage and the power transmission path of a first modification in which the vehicle is started by adding the motor torque as the assist torque.
Figure 9:
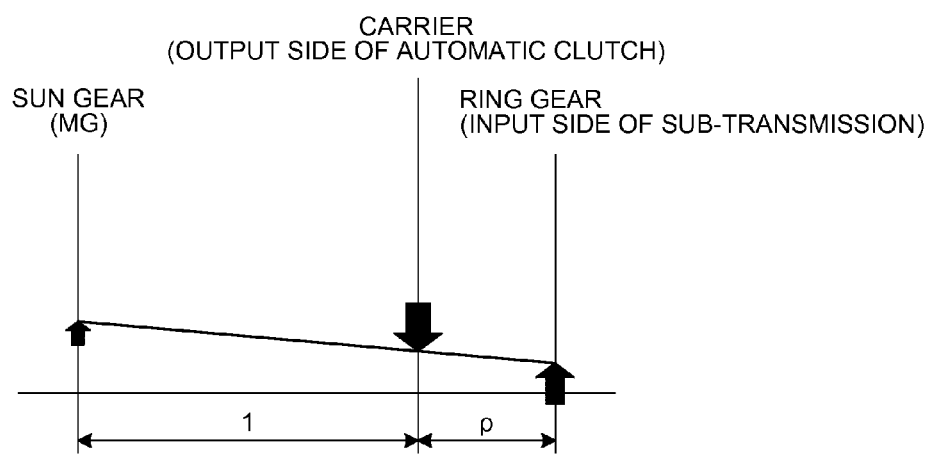
FIG. 9 is a collinear diagram of the differential device of the embodiment when the motor torque is added as the assist torque after the power transmission path has been switched to the main gear shift stage and a collinear diagram of the differential device in the first modification at the time of vehicle start.

At the time of vehicle start, since the automatic clutch 30 slips in the semi-engaged state, it is preferable to reduce the engine torque to improve the durability of the automatic clutch 30. For the purpose, it is preferable, for example, that after the switching to the vehicle start main gear shift stage (the first gear speed) and the switching to the vehicle start sub-gear shift stage (the first gear speed) of the sub-transmission 50 described above have been finished, the controller power-running drives the motor/generator 20, transmits the motor torque to the driving wheels W via the differential device 60, the main transmission 40, and the sub-transmission 50, and reduces the engine torque in an amount corresponding to a drive force of the driving wheels W increased by the motor torque (FIGS. 8, 9). In the hybrid system 1 at the time, a so-called power circulation occurs in which a part of the motor torque output from the main transmission 40 is transmitted to the sub-transmission 50 in place of the driving wheels W and input to the differential device 60 via the ring gear.

Further, when a vehicle start operation can be completed only by the engine torque, it is sufficient to carry out the control described above. However, when it is difficult to complete the vehicle start operation only thereby, the motor torque is preferably used as assist torque to the driving wheels W. For example, after the switching to the vehicle start main gear shift stage (the first gear speed) described above has been finished, the sub-transmission 50 may be connected to the vehicle start sub-gear shift stage (the first gear speed) and the controller may power-running drive the motor/generator 20 and transmit the motor torque to the driving wheels W via the differential device 60, the main transmission 40, and the sub-transmission 50.

[First Modification]

Incidentally, when the vehicle is started, the controller of the embodiment described above regeneratively drives the motor/generator 20 to cause the motor/generator 20 to be in charge of the reaction force of the engine torque. Thus, when a value showing a charge state (SOC: state of charge) of the rechargeable battery 25 (hereinafter, called "SOC value") exceeds a predetermined value and the rechargeable battery 25 becomes full charge state, since the motor/generator 20 cannot be caused to be in charge of the reaction force of the engine torque, the engine start using the rotation number difference of the automatic clutch 30 and the differential device 60 as shown in the embodiment cannot be employed.

To cope with the problem, in a modification, the engine torque is transmitted to the driving wheels W via the automatic clutch 30 in the semi-engaged state and via the main transmission 40 connected to the vehicle start main gear shift stage (the first gear speed), and the motor torque at the time of power running drive is transmitted to the driving wheels W via the differential device 60 and the main transmission 40 and the sub-transmission 50 connected to the vehicle start main gear shift stage (the first gear speed) (FIGS. 8, 9). At the time, when the sub-gear shift stage of the sub-transmission 50 being connected is in a higher gear stage, a gear ratio between the motor/generator 20 and the driving wheels W becomes larger. Namely, in the modification, the vehicle is started by controlling the hybrid system to a so-called parallel hybrid state in which a power transmission path from the engine 10 to the driving wheels W and a power transmission path from the motor/generator 20 to the driving wheels W become in parallel with each other.

In the controller of the hybrid system 1 of the modification, when the vehicle is started, the main transmission 40 is connected to the vehicle start main gear shift stage (the first gear speed) and also to the sub-transmission 50 and the motor/generator 20 is power running driven so that the motor/generator 20 is not caused to be in charge of the reaction force of the engine torque. Because of the reason, in the hybrid system 1 at the time, the so-called power circulation occurs in which a part of motor torque output from the main transmission 40 is transmitted to the sub-transmission 50 in place of the driving wheels W and input to the differential device 60 via the ring gear. At the time, the reaction force of the motor torque is received by transmitting the part of the motor torque to the differential device 60.

As described above, when the vehicle is started, the controller generates the drive force to the driving wheels W by the engine torque and the motor torque. Namely, in the hybrid system 1, the drive force of the driving wheels W is assisted by the motor torque. According to the controller, overcharge of the rechargeable battery 25 can be avoided, the load of the automatic clutch 30 in the semi-engaged state to which the engine torque is transmitted is reduced, and the durability of the automatic clutch 30 can be improved.

In the embodiment described above, the vehicle is started in the order of FIG. 3→FIG. 7→FIG. 8, that is, the vehicle begins to start at the vehicle start sub-gear shift stage while the automatic clutch 30 is being slip controlled and the sub-gear shift stage is switched to the main gear shift stage after the rotation number of the engagement member 32 of the automatic clutch 30 has been reduced to cause the rotation number to correspond to the vehicle start main gear shift stage, and the start operation is carried out using also the motor torque. In the modification, the vehicle may be caused to start in the order opposite to the embodiment. Namely, in the modification, the vehicle begins to start at the vehicle start main gear shift stage by the engine torque and the motor torque at the time of power running drive while slip controlling the automatic clutch 30 as described above, and thereafter the motor/generator 20 is switched to the regeneration drive while compensating the drive force of the driving wheels W with the engine torque. Here, the motor/generator 20 is caused to be in charge of the reaction force of the engine torque and switching to the sub-gear shift stage is carried out after the rotation number of the input shaft 51 of the sub-transmission 50 has been increased to cause the rotation number to correspond to the vehicle start sub-gear shift stage. According to the configuration, when the vehicle is started, an amount of electric power supplied from the rechargeable battery 25 to the motor/generator 20 can be suppressed low.

[Second Modification]

Although the controller of the first modification described above can start the vehicle when the rechargeable battery 25 is in full charge, when the SOC value of the rechargeable battery 25 becomes small, the controller cannot employ the vehicle start as in the first modification which uses the assist torque obtained by the power running drive of the motor/generator 20 together with the engine torque (hereinafter, called "MG assist start"). Because of the reason, the controller of the modification selectively uses the engine start using the rotation number difference of the automatic clutch 30 and the differential device 60 as in the embodiment and the MG assist start as in the first modification according to the SOC value of the rechargeable battery 25.

Figure 10:
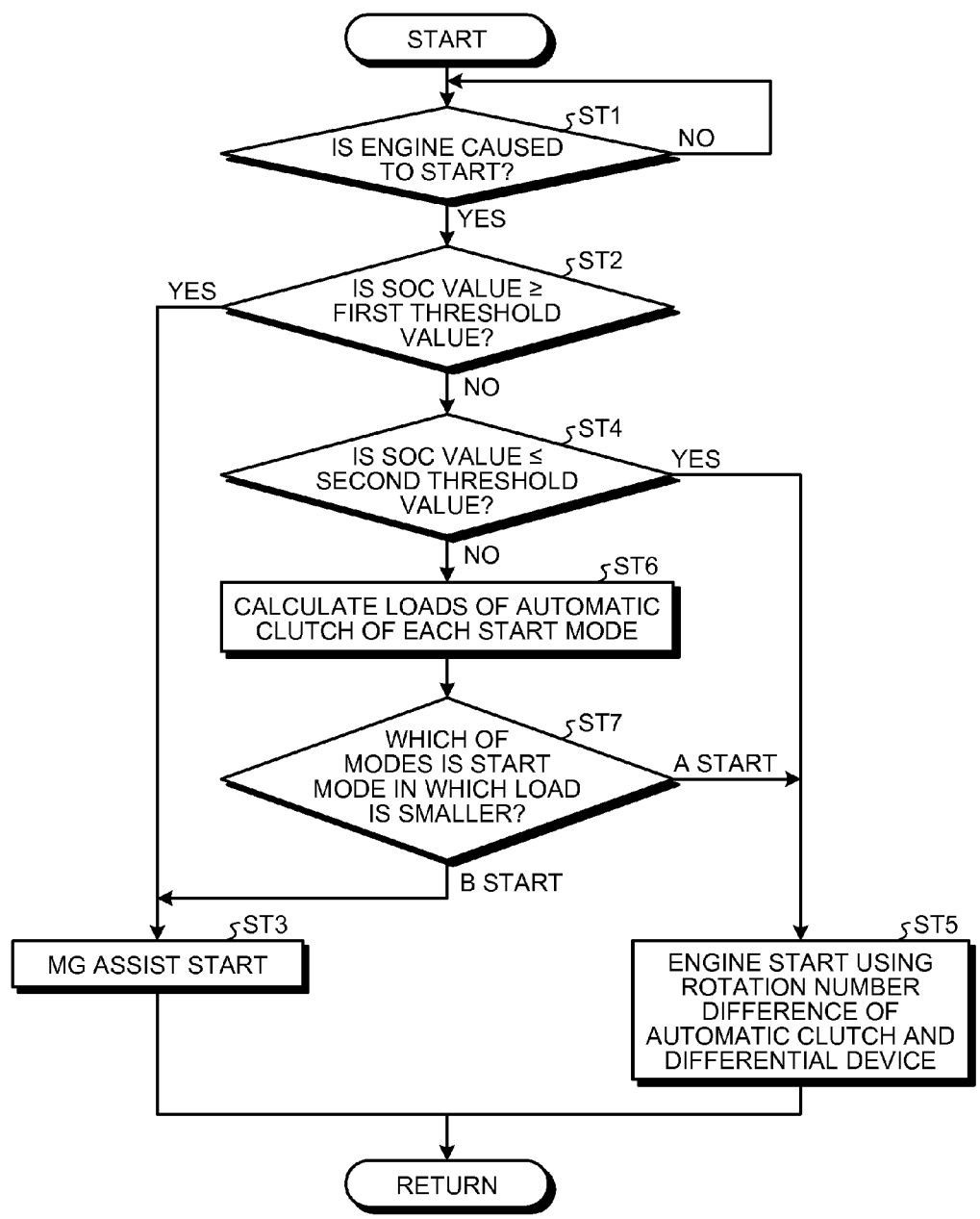
FIG. 10 is a flowchart explaining an arithmetic processing operation of a controller of a second modification.

An arithmetic processing operation of a controller of the modification will be explained using a flowchart of FIG. 10.

The controller determines whether or not the vehicle start using the engine torque (engine start) is carried out (step ST1), and when the engine start is not carried out, the controller repeats the determination. The determination at step ST1 is started after, for example, an ignition on signal has been detected. When it is determined that the engine start is not carried out, the determination is carried out at least until the vehicle has started.

When the engine start is carried out, the controller determines whether or not the SOC value of the rechargeable battery 25 is equal to or more than a predetermined value (a first threshold value) (step ST2). The first threshold value is a value for avoiding overcharge of the rechargeable battery 25 and, in the hybrid system 1, a threshold value which is set to prohibit charge of the rechargeable battery 25, is set. As the first threshold value, for example, the SOC value, which shows full charge, or the SOC value, which shows a fear that full charge is achieved by the charge carried out by the vehicle start of the embodiment, is set. When the SOC value is equal to or more than the first threshold value, a charge prohibition condition of the rechargeable battery 25 is established.

When the controller determines that the SOC value is equal to or more than the first threshold value and there is a fear that the rechargeable battery 25 is overcharged, the controller carries out the vehicle start of the first modification described above, that is, the MG assist start by the engine torque and the motor torque by the power running drive (step ST3). With the operation, the controller can obtain the effect shown in the first modification, i.e. an avoidance of overcharge of the rechargeable battery 25 and an improvement of durability resulting from the reduction of load of the automatic clutch 30.

In contrast, when the controller determines that the SOC value is smaller than the first threshold value and overcharge of the rechargeable battery 25 can be avoided, next, the controller determines whether or not the SOC value is equal to or less than a predetermined value {a second threshold value (< the first threshold value)} (step ST4). The second threshold value is a value for avoiding the insufficient charge of the rechargeable battery 25 and a threshold value, which is set to determine that it is necessary to charge the rechargeable battery 25 in the hybrid system 1, is set. Set as the second threshold value is, for example, the SOC value which shows that when electric power is supplied from the rechargeable battery 25 to various electric equipment including the motor/generator 20, there is a fear that the electric equipment lacks electric power. When the SOC value is equal to or less than the second threshold value, a discharge prohibition condition of the rechargeable battery 25 is established.

When the controller determines that the SOC value is equal to or less than the second threshold value and it is necessary to charge the rechargeable battery 25, the controller carries out the vehicle start of the embodiment described above, that is, the engine start using the rotation number difference of the automatic clutch 30 and the differential device 60 (step ST5). With the operation, the controller can obtain the effect shown in the embodiment, i.e. the avoidance of the insufficient charge of the rechargeable battery 25, the improvement of the durability resulting from the reduction of the load of the automatic clutch 30, etc.

In a state that the rechargeable battery 25 can be charged and discharged, the vehicle can be started by the engine start using the rotation number difference of the automatic clutch 30 and the differential device 60 as in the embodiment and further can be also started by the MG assist start as in the first modification. Because of the reason, in the case, the controller determines which of the vehicle starts imposes a smaller load on the automatic clutch 30 and starts the vehicle in a mode having a smaller load.

Thus, when a negative determination is made at step ST4 and it is found that the SOC value is smaller than the first threshold value and larger than the second threshold value, the controller calculates the load of the automatic clutch 30 at the time of the engine start using the rotation number difference of the automatic clutch 30 and the differential device 60 (here, called also "A start" for the purpose of convenience) and the load of the automatic clutch 30 at the time of the MG assist start (here, called also "B start" for the purpose of convenience) (step ST6) and determines which of the vehicle starts can more reduce the load of the automatic clutch 30 (step ST7).

For example, although the rotation number difference of the engagement members 31, 32 of the automatic clutch 30 in the A start is smaller than that in the B start, since the vehicle is started only by the engine torque, a larger amount of torque is transmitted to the automatic clutch 30. In contrast, although the rotation number difference of the front side and the rear side of the automatic clutch 30 in the B start is larger than that in the A start, since the vehicle can be started by reducing the engine torque by the motor torque due to the power running drive, a smaller amount of torque is transmitted to the automatic clutch 30. Because of the reason, in the example, for example, an influence on the load of the automatic clutch 30 due to the rotation number difference of the automatic clutch 30 and an influence on the load of the automatic clutch 30 due to a magnitude of input torque of the engagement member 31 are previously obtained by an experiment and a simulation and a map showing the influences by index is prepared. In the map showing the influences due to the rotation number difference of the automatic clutch 30, a larger rotation number difference more increases an index value as to the load of the automatic clutch 30. Further, in the map showing the influence due to the input torque of the engagement member 31, a larger amount of the input torque more increases the index value as to the load of the automatic clutch 30.

At steps ST6, ST7, the rotation number of the engagement member 31 (which may be replaced with the engine rotation number) and the rotation number of the engagement member 32 (which may be replaced with the input shaft 41 of the main transmission 40 and the rotation number of the carrier of the differential device 60) when the A start is carried out and when the B start is carried out are estimated, respectively, the rotation number difference of them is applied to the map, and the index value as to the load of the automatic clutch 30 is determined. Further, at steps ST6, ST7, the respective amounts of engine torque when the A start is carried out and when the B start is carried out are estimated, the respective amounts of engine torque are applied to the map, and the index values as to the load of the automatic clutch 30 are determined. For example, the respective index values of each start mode are added, a total amount of the respective index values in the A start is compared with a total amount of the respective index values in the B start, and a start mode having a smaller total value is determined as a start mode capable of reducing the load of the automatic clutch 30.

When it is determined at step ST7 that the A start can more reduce the load of the automatic clutch 30, the controller goes to step ST5 and carries out the engine start using the rotation number difference of the automatic clutch 30 and the differential device 60. In contrast, when it is determined at step ST7 that the B start can more reduce the load of the automatic clutch 30, the controller goes to step ST3 and carries out the MG assist start.

As described above, according to the controller of the modification, the vehicle can be started while improving durability by suppressing the load of the automatic clutch 30 and stabilizing the SOC value of the rechargeable battery 25.

[Third Modification]

In the embodiment and the first and second modifications described above, although the operation of the hybrid system 1 at the time of vehicle start has been explained, the controller of the embodiment and the first and second modifications, can apply the technology for suppressing the output of the rechargeable battery 25 when the vehicle is started also to a case that the speed of the main transmission 40 is changed.

For example, in the hybrid system 1, when the main transmission 40 is up-shifted, it is up-shifted to a requested main gear shift stage after the power transmission path from the engine 10 to the driving wheels W has been switched once to the sub-gear shift stage of the sub-transmission 50. At the time of up-shift from, for example, the first gear speed to the second gear speed, the speed of the main transmission 40 is changed to the second gear speed via the 1.5 gear speed of the sub-transmission 50.

This will be explained here as to an example in which the main transmission 40 is up-shifted from the first gear speed to the second gear speed in a state that the engine rotation number is 3000 rpm and the engine rotation number is reduced to 2000 rpm. Note that the engine rotation number of 2000 rpm is a synchronous rotation number for suppressing an occurrence of gear shift shock when the main transmission 40 is switched to the requested main gear shift stage that is the second gear speed.

Figure 11:
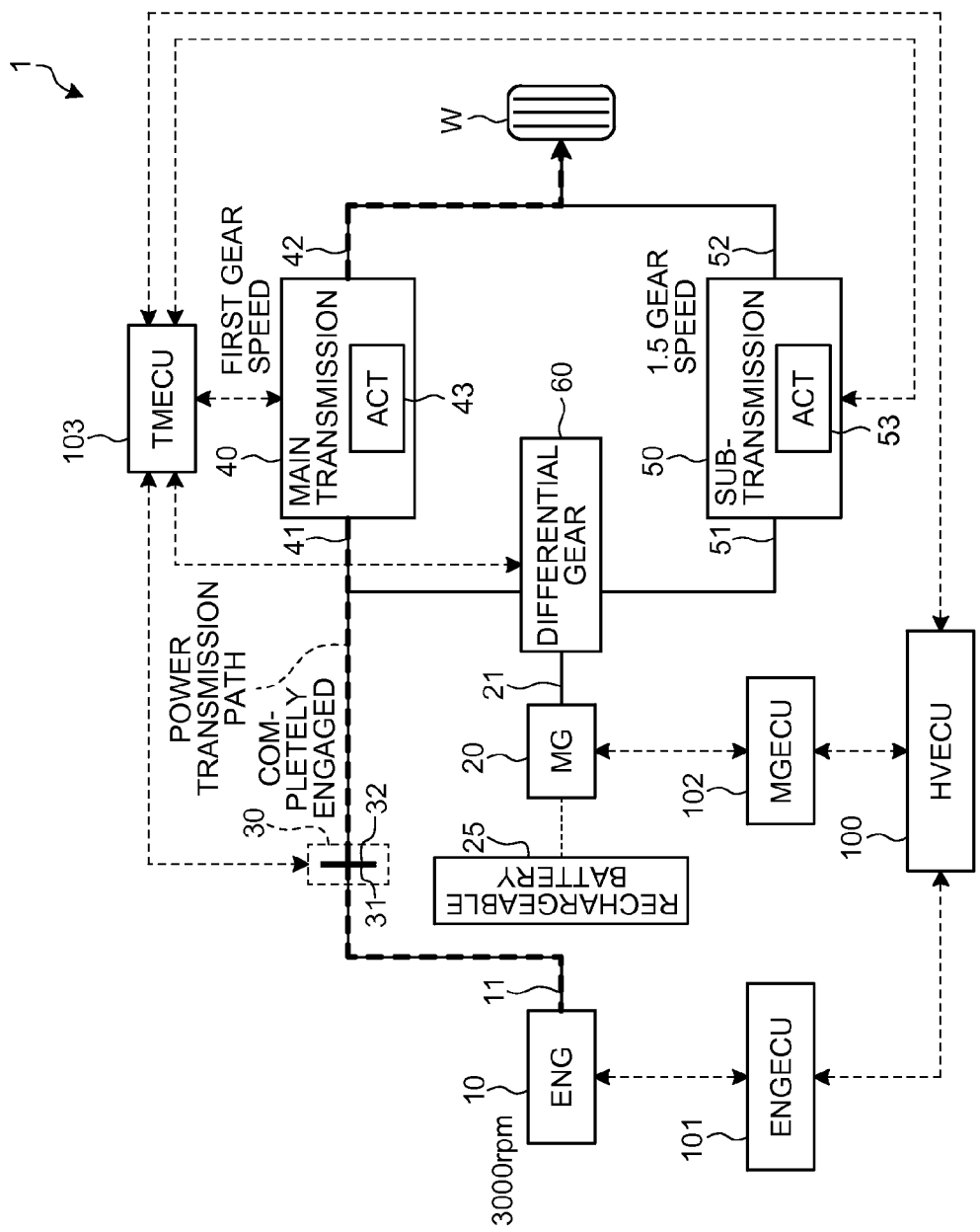
FIG. 11 is a view illustrating a power transmission path in a third modification before a speed of a hybrid system is changed.
Figure 12:
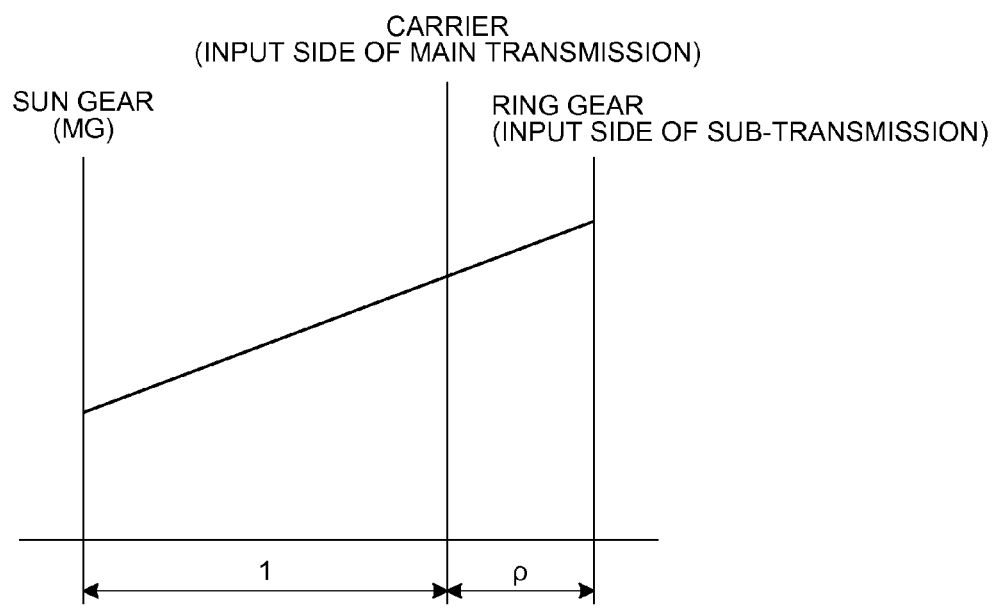
FIG. 12 is a collinear diagram of the differential device in a third modification before a speed is changed.

FIG. 11 is a view illustrating the power transmission path of the hybrid system 1 at the time of travel by the engine torque and illustrates a travel state when the main gear shift stage is the first gear speed. FIG. 12 is a collinear diagram of the differential device 60 in the travel state. Here, the engine torque when the engine rotation number is 3000 rpm is transmitted via the automatic clutch 30 in the completely engaged state. Further, in the sub-transmission 50, a gear pair at the sub-gear shift stage of the 1.5 gear speed is in a meshed state and the sub-gear shift stage is connected. Since the hybrid system 1 at the time is controlled so as not to cause the motor/generator 20 to be in charge of the reaction force of the engine torque, the engine torque via the automatic clutch 30 is transmitted to the driving wheel W sides via the first gear speed of the main transmission 40 in place of the 1.5 gear speed of the sub-transmission 50.

Figure 13:
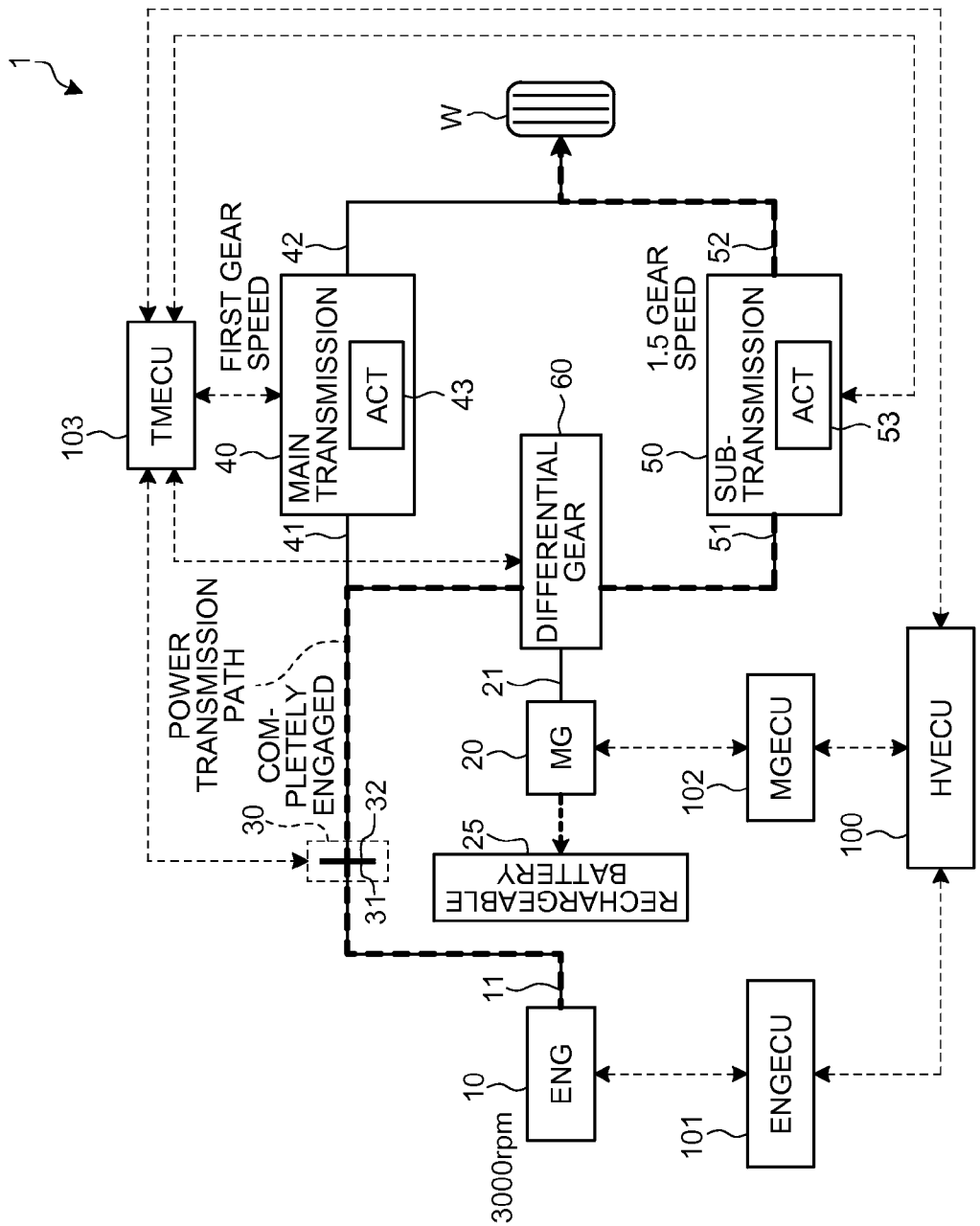
FIG. 13 is a view when the power transmission path is switched from the main gear shift stage to the sub-gear shift stage before a speed is changed in the third modification.
Figure 14:
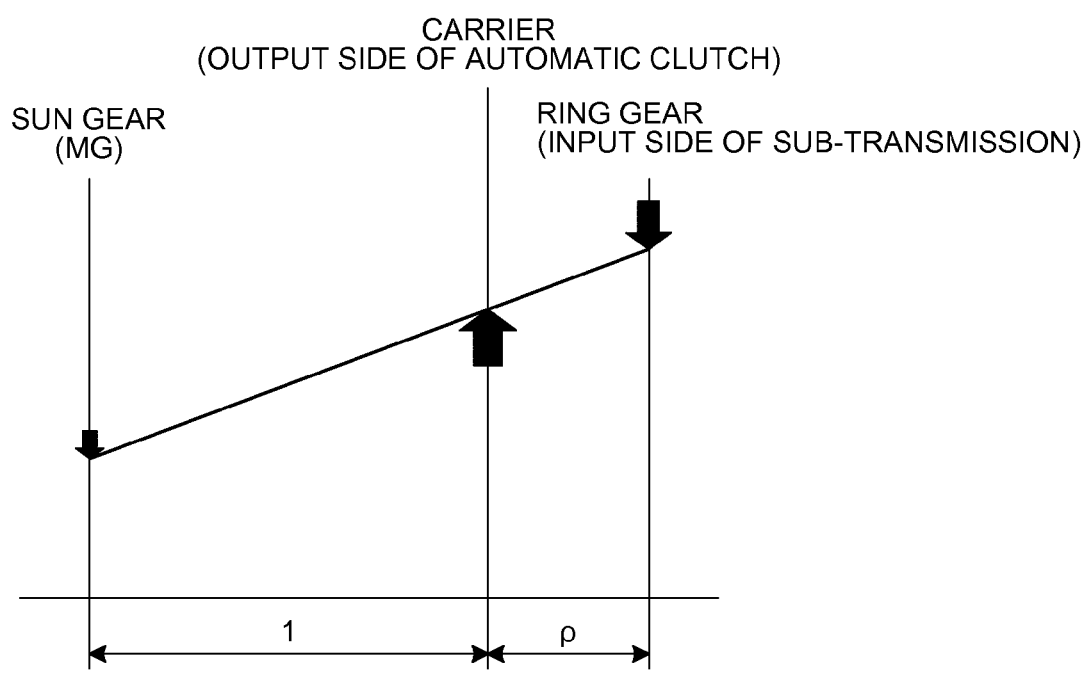
FIG. 14 is a collinear diagram of the differential device when the power transmission path is switched from the main gear shift stage before the speed is changed to the sub-gear shift stage in the third modification.
Figure 15:
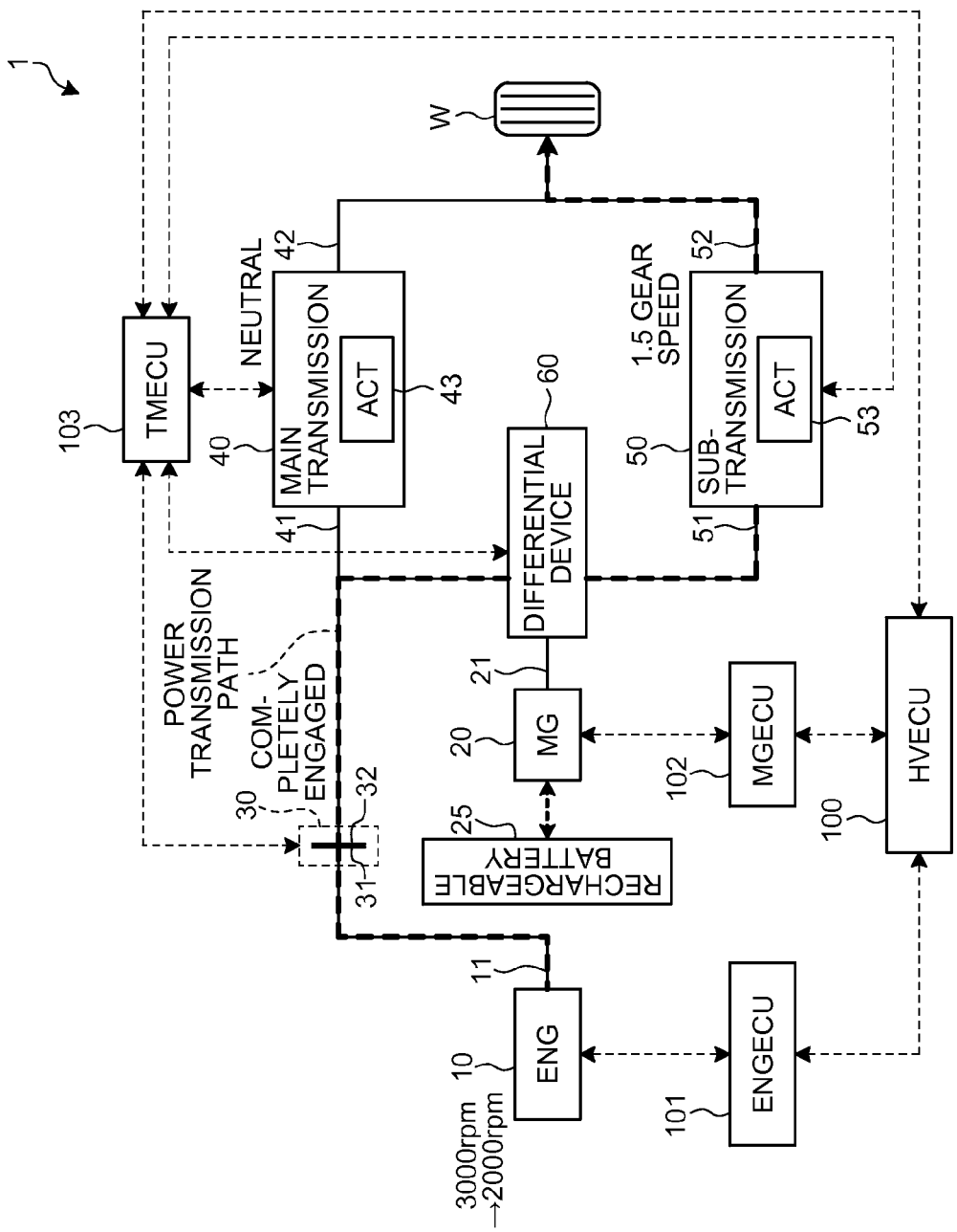
FIG. 15 is a view illustrating the power transmission path when a main-transmission is controlled to a neutral state and an engine rotation number is reduced in the third modification.
Figure 16:
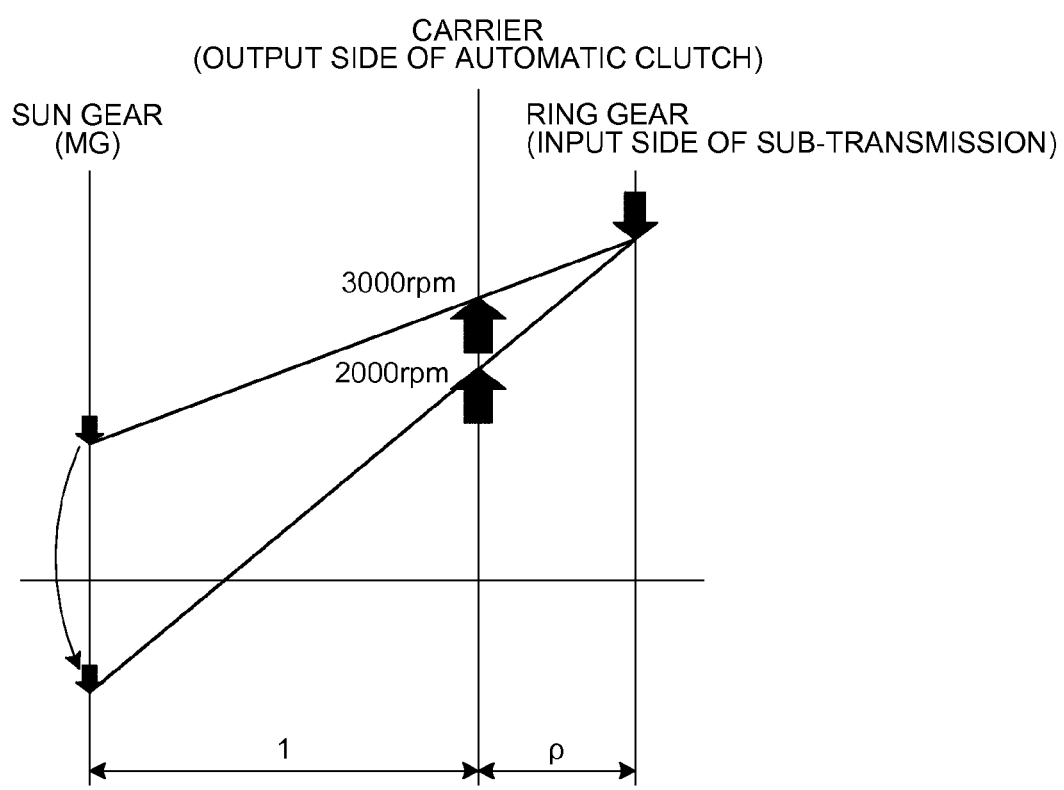
FIG. 16 is a collinear diagram of the differential device when the main-transmission is controlled to the neutral state and the engine rotation number is reduced in the third modification.
Figure 17:
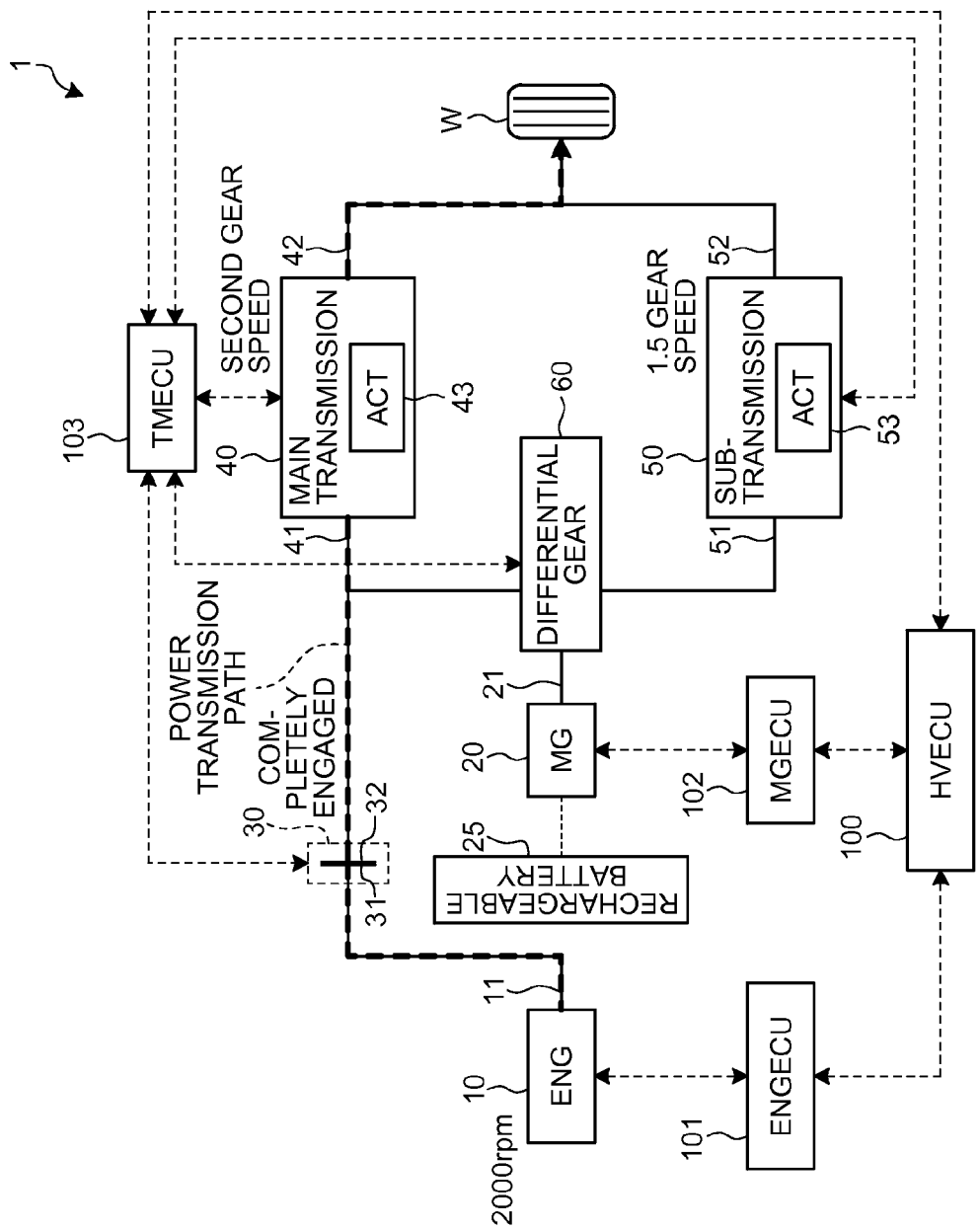
FIG. 17 is a view when the power transmission path is switched from the sub-gear shift stage to a requested main gear shift stage in the third modification.
Figure 18:
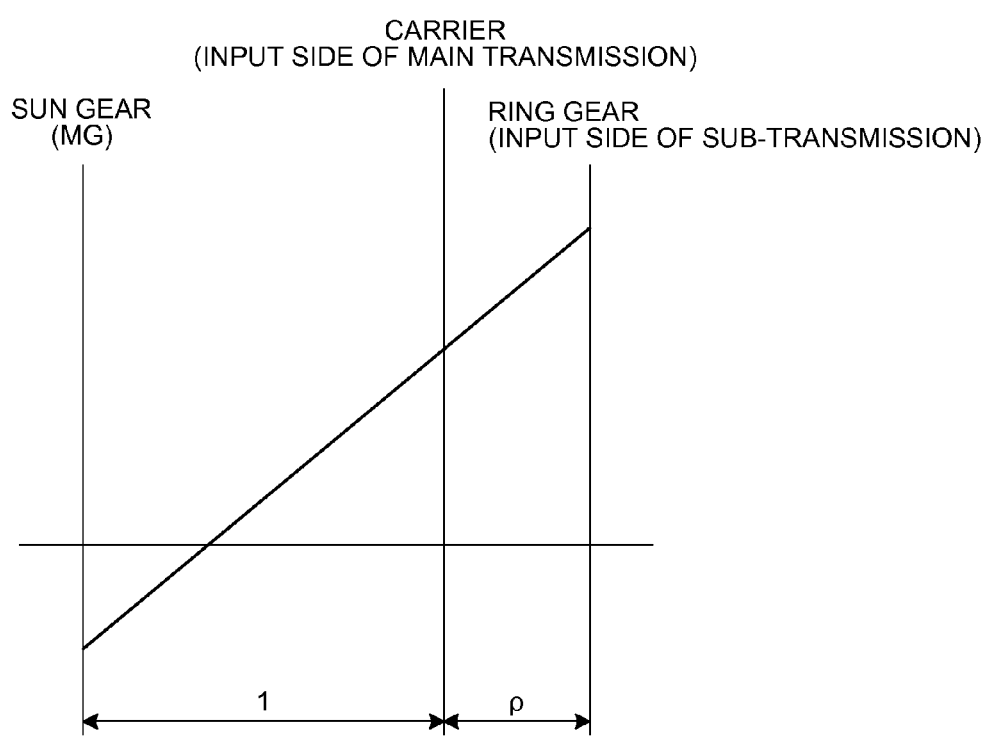
FIG. 18 is a collinear diagram of the differential device when the power transmission path is switched from the sub-gear shift stage to the requested main gear shift stage in the third modification.

When the controller detects an up-shift request to the second gear speed, the controller controls the motor/generator 20 so that it is caused to be in charge of the reaction force of the engine torque and switches a transmission path of the engine torque via the automatic clutch 30 from the first gear speed of the main transmission 40 to the 1.5 gear speed of the sub-transmission 50 (FIGS. 13, 14). The controller controls the main transmission 40 to the neutral state and controls the motor rotation number while causing the motor/generator 20 to be in charge of the reaction force of the engine torque to thereby reduce the engine rotation number from 3000 rpm to 2000 rpm (FIGS. 15, 16). At the time, the motor rotation number is changed while keeping the rotation number of the ring gear of the differential device 60, i.e. the rotation number of the driving wheels W constant. When the engine rotation number is reduced to 2000 rpm, the controller connects the main transmission 40 to the second gear speed and controls the motor/generator 20 so as not to cause it to be in charge of the reaction force of the engine torque so that the transmission path of the engine torque via the automatic clutch 30 is switched from the 1.5 gear speed of the sub-transmission 50 to the second gear speed of the main transmission 40 (FIGS. 17, 18).

As described above, when the speed of the main transmission 40 is changed in the hybrid system 1, the main transmission 40 is placed in the neutral state when power is transmitted to the driving wheels W at the sub-gear shift stage and the motor/generator 20 is caused to be in charge of the reaction force of the engine torque. Thus, the motor/generator 20 and the rechargeable battery 25 require a larger output when an amount of the engine torque is larger (that is, when the accelerator opening degree is larger).

Figure 19:
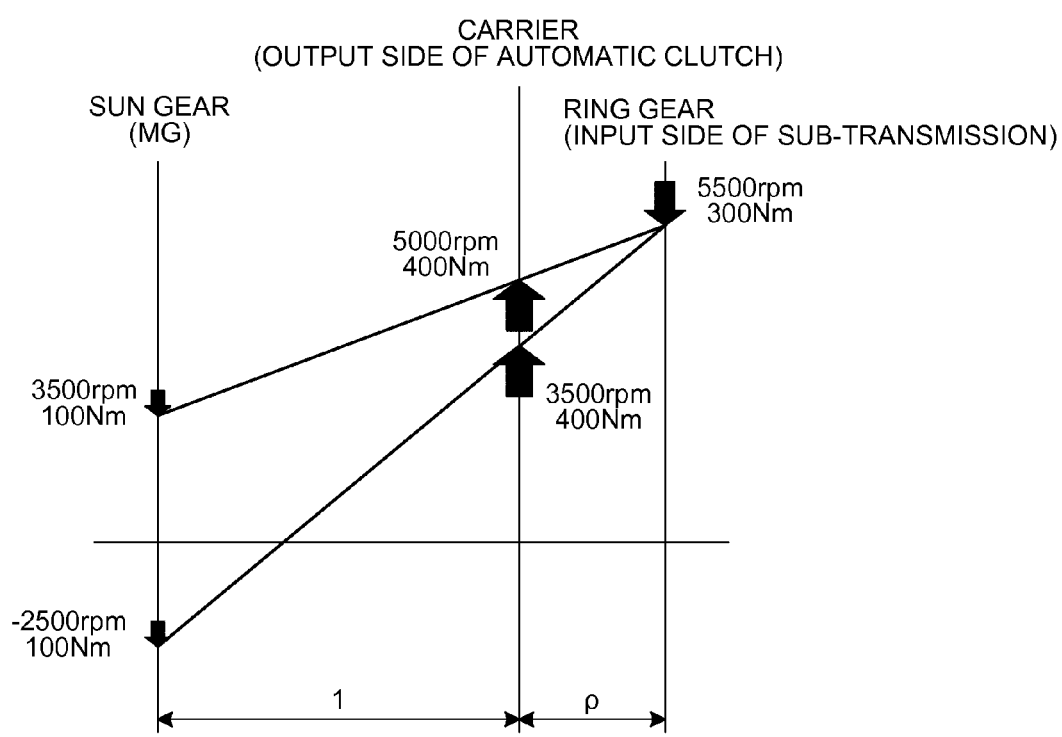
FIG. 19 is a view illustrating a specific example of the collinear diagram of the differential device when the engine rotation number is reduced in the third modification.
Figure 20:
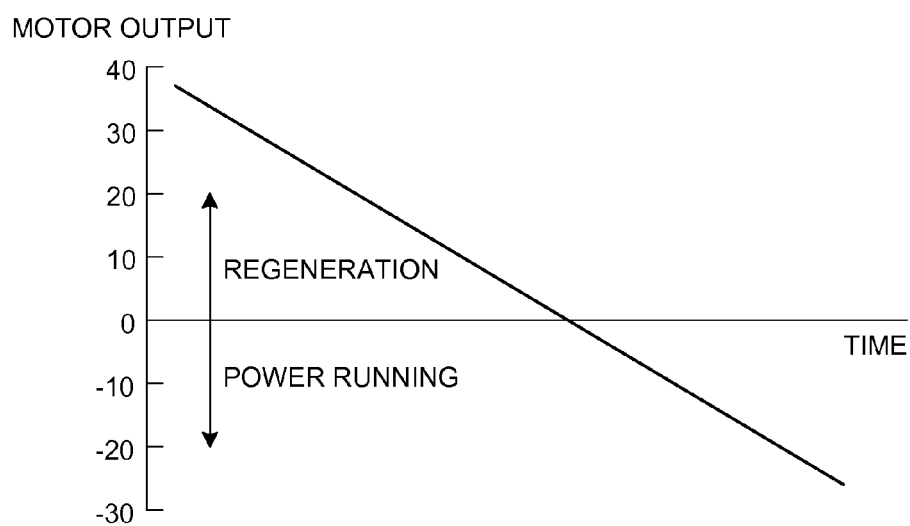
FIG. 20 is a view illustrating a change of output of a conventional motor at the time of gear shift.

An example will be explained here that the engine rotation number is reduced from 5000 rpm to 3500 rpm while transmitting 400 Nm of engine torque in a state that power is transmitted to the driving wheels W at the sub-gear shift stage during the gear shift operation (FIG. 19). It is assumed here that the rotation number of the ring gear of the differential device 60, i.e., the rotation number of the input shaft 51 of the sub-transmission 50 is set to 5500 rpm. In the case, since the engine torque is 400 Nm and the gear ratio ρ of the differential device 60 is ⅓, the torque in the ring gear and the input shaft 51 is calculated as 300 Nm and the motor torque is calculated as 100 Nm. At the time, in the motor/generator 20, since the motor rotation number is changed from +3500 rpm (regeneration) to −2500 rpm (power running) at the motor torque of 100 Nm, a motor output thereof is changed as shown in FIG. 20. According to the drawing, it can be found that when the engine rotation number is reduced from 5000 rpm to 3500 rpm while transmitting 400 Nm of engine torque, the maximum output required by the motor/generator 20 is 37 kW when 100 Nm of motor torque is regenerated by the motor rotation number of +3500 rpm. Namely, the rechargeable battery 25 necessary to the gear shift operation is required to have a capacity whose output restriction is at least equal to or more than 37 kW.

Figure 21:
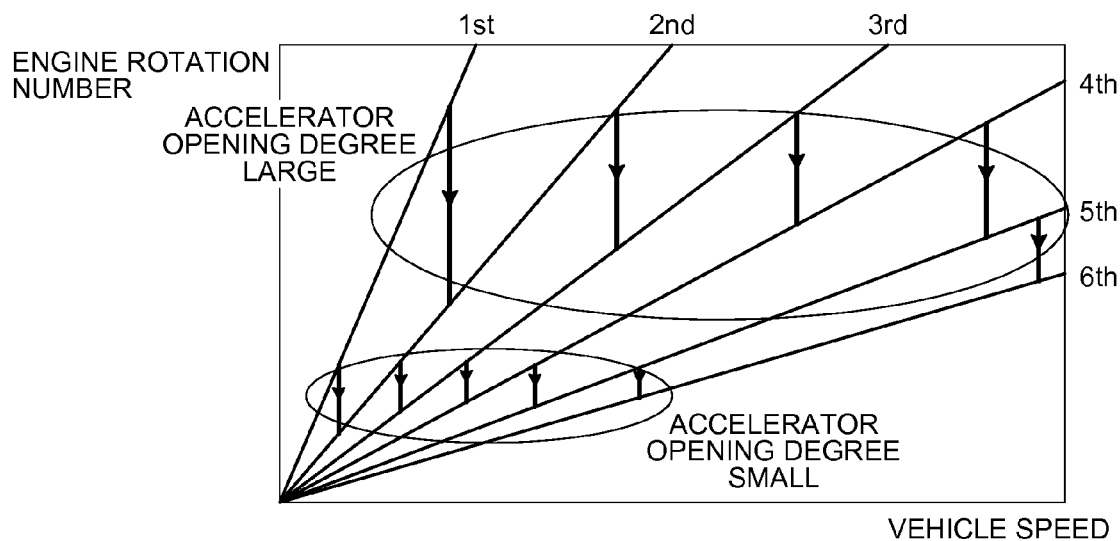
FIG. 21 is a view illustrating an example of a relation between a vehicle speed and an engine rotation number at respective main gear shift stage and gear shift lines at the time of up-shift to an accelerator opening degree.

FIG. 21 illustrates an example of a relation of a vehicle speed and an engine rotation number at respective main gear shift stages and gear shift lines to the accelerator opening degree at the time of the up-shift. As apparent also from the drawing, a larger accelerator opening degree (a larger amount of engine torque) more increases a difference of engine rotation numbers before and after a speed is changed. Thus, in the hybrid system 1, when the accelerator opening degree is larger, since a change of the engine rotation number is made by a larger change of the motor rotation number for changing the speed, the rechargeable battery 25 having a higher output restriction is required.

In the hybrid system 1, when the outputs of the motor/generator 20 and the rechargeable battery 25 can be reduced when the gear shift operation as described above is carried out, an increase of capacity of the rechargeable battery 25 can be suppressed and cost of the system can be reduced. Thus, in the controller of the hybrid system 1, when the rechargeable battery 25 exceeds the output restriction, the output of the rechargeable battery 25 is reduced by reducing the engine torque. Namely, in the case, the reaction force of the engine torque, which is in charge of the motor/generator 20, is reduced by reducing the engine torque, thereby reducing the output of the motor/generator 20 (that is, the output of the rechargeable battery 25). The controller reduces the engine torque so that the output of the rechargeable battery 25 does not exceed the output restriction.

Figure 22:
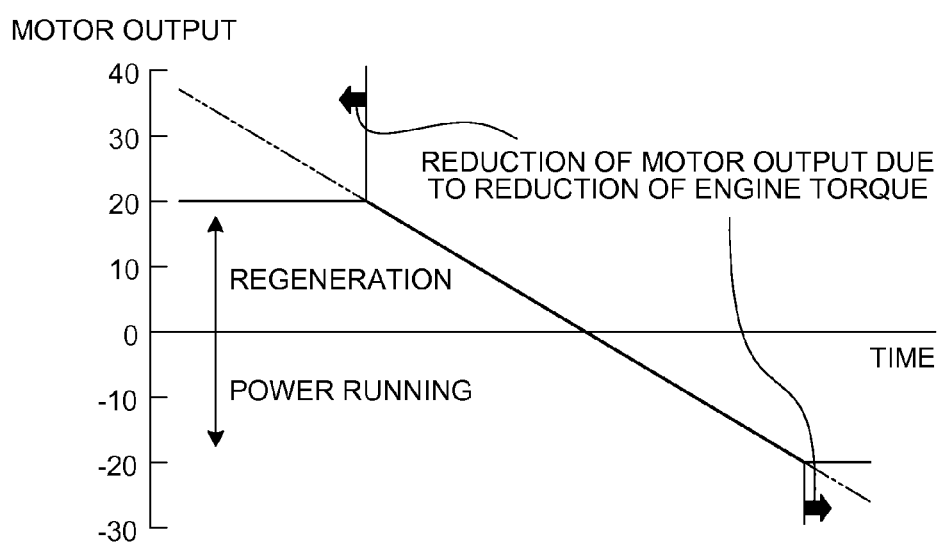
FIG. 22 is a view illustrating a change of motor output at the time of shifting gears in the third modification.

For example, the output restriction of the rechargeable battery 25 is set to 20 kW (regeneration side: 20 kW, power running side: −20 kW). In the case, at the time of the gear shift control described above, when a result of calculation that the outputs of the motor/generator 20 and the rechargeable battery 25 exceed 20 kW is obtained, the controller reduces the engine torque so that the outputs fall within 20 kW (FIG. 22). In FIG. 22, the output of the motor/generator 20 is suppressed to 20 kW (regeneration side: 20 kW, power running side: −20 kW) by reducing the engine torque. Note that an alternate long and short dash line in FIG. 22 illustrates a change of output of the motor/generator 20 of FIG. 20 when the engine torque is not reduced.

Figure 23:
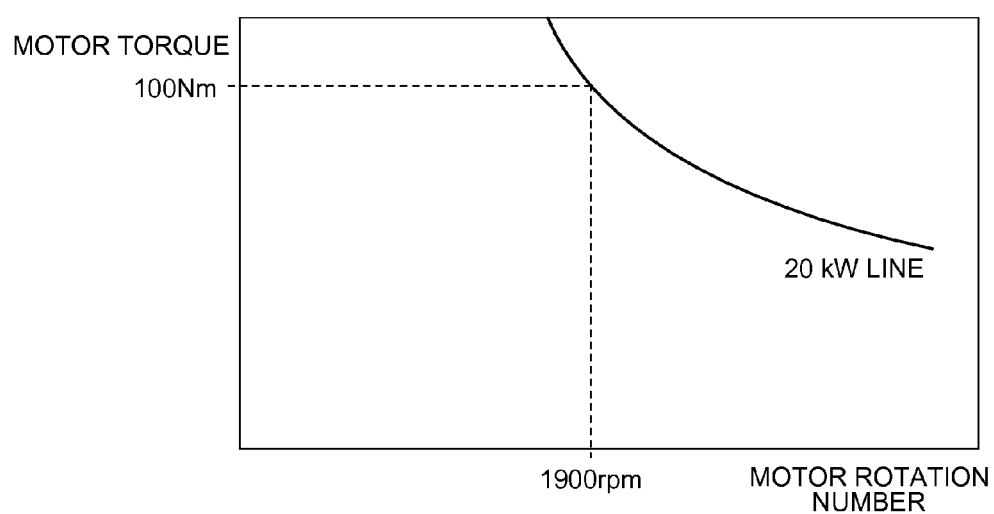
FIG. 23 is a view illustrating a relation among a motor rotation number, motor torque, and a motor output.

For the motor/generator 20 to output 20 kW, it is necessary that a higher motor rotation number more reduce the motor torque (FIG. 23). FIG. 23 illustrates a relation of the motor rotation number and the motor torque when the output of the motor/generator 20 is 20 kW. When the motor/generator 20 reduces the engine rotation number from 5000 rpm to 3500 rpm while transmitting 400 Nm of engine torque as in the example described above, the motor/generator 20 generates 100 Nm of motor torque. It is found from FIG. 23 that when the output of the motor/generator 20 is 20 kW, 100 Nm of motor torque is generated by the motor rotation number of 1900 rpm. Thus, when the motor rotation number is lower than 1900 rpm, the controller in the example generates 100 Nm of motor torque while keeping the engine torque to 400 Nm. With the operation, the output of the rechargeable battery 25 can be suppressed lower than 20 kW that is the output restriction. Further, when the motor rotation number is equal to or more than 1900 rpm, the controller reduces the motor torque by reducing the engine torque smaller than 400 Nm when the motor rotation number is higher so that the output of the motor/generator 20 does not exceed a 20 kW line of FIG. 23 (so that the an operation point of the motor/generator 20 does not go to a right side of the sheet across the 20 kW line of FIG. 23) and controls the motor/generator 20 and the rechargeable battery 25 so that the outputs thereof do not exceed 20 kW. With the operation, the output of the rechargeable battery 25 is reduced equal to or less than 20 kW that is the output restriction.

As shown above, the controller of the modification not only can obtain an effect of the reduction of output of the rechargeable battery 25 shown in the embodiment and the first and second modifications when the vehicle starts but also can reduce the output of the rechargeable battery 25 also when the speed of the main transmission 40 is changed. Thus, the controller can suppress the increase of capacity of the rechargeable battery 25 and the increase of cost of the system.

Incidentally, the hybrid system 1 of the embodiment and the first to third modifications described above has been exemplified assuming that it includes the main transmission 40 and the sub-transmission 50, the main transmission 40 and the sub-transmission 50 may be replaced with a so-called dual clutch transmission (DCT). Namely, the main transmission 40 is configured as an even stage of the dual clutch transmission and the sub-transmission 50 is configured as an odd stage of the dual clutch transmission.

Figure 24:
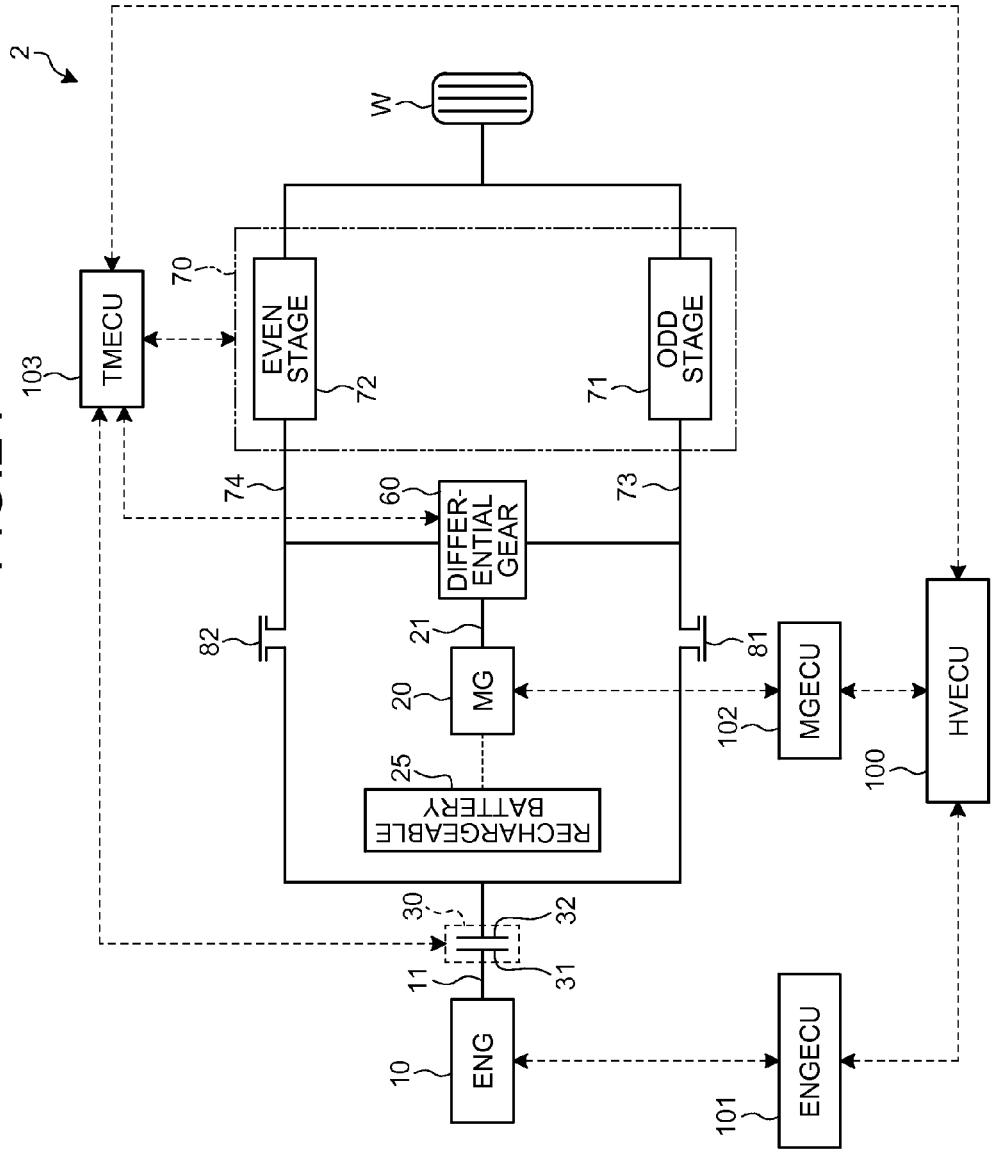
FIG. 24 is a view when the main-transmission and a sub-transmission are replaced with a dual clutch transmission.

FIG. 24 illustrates a hybrid system 2 as described above. In a dual clutch transmission 70 of the hybrid system 2, an odd stage 71 includes, for example, a first gear speed, a third gear speed, and a fifth gear speed. In contrast, an even stage 72 includes a second gear speed, a fourth gear speed, and a sixth gear speed. Here, the first gear speed becomes a vehicle start gear shift stage in the odd stage 71 and the second gear speed becomes a vehicle start gear shift stage in the even stage 72. The hybrid system 2 is different from the hybrid system 1 in that the engagement member 32 of the automatic clutch 30 is coupled with an input shaft 73 of the odd stage 71 via a dog clutch 81 and coupled with an input shaft 74 of the even stage 72 via a dog clutch 82. Further, the differential device 60 is different from that of the hybrid system 1 in that a rotary element on the odd stage 71 side is coupled with the engagement member 32 via the dog clutch 81 and a rotary element on the even stage 72 side is coupled with the engagement member 32 via the dog clutch 82.

The controller of the hybrid system 2 may be thought by replacing each of the main transmission 40 and the sub-transmission 50 with a gear shift stage of the dual clutch transmission 70 in the embodiment and the first to third modifications described above and each of them can obtain the same effect as the embodiment, etc.

REFERENCE NUMERALS 1, 2 HYBRID SYSTEM
10 ENGINE
11 OUTPUT SHAFT
20 MOTOR/GENERATOR
21 ROTATING SHAFT
25 RECHARGEABLE BATTERY
30 AUTOMATIC CLUTCH
31, 32 ENGAGEMENT MEMBER
40 TRANSMISSION (MAIN-TRANSMISSION)
41 INPUT SHAFT
50 SUB-TRANSMISSION (GEAR GROUP)
51 INPUT SHAFT
60 DIFFERENTIAL DEVICE
70 DUAL CLUTCH TRANSMISSION
71 ODD STAGE
72 EVEN STAGE
73 INPUT SHAFT
74 INPUT SHAFT
100 HVECU
101 ENGINE ECU (ENGECU)
102 MGECU
103 GEAR SHIFT ECU (TMECU)
W DRIVING WHEEL

The invention claimed is:

1. A controller of a hybrid system, the hybrid system including: an engine; a motor/generator; an automatic clutch to which output torque of the engine is input; a main transmission configured to transmit input torque to a driving wheel side; a sub-transmission configured to transmit additional input torque to the driving wheel side; and a differential device provided with a first rotary element connected to a torque input side of the main transmission and an output side of the automatic clutch, a second rotary element connected to a torque input side of the sub-transmission and a third rotary element connected to a rotating shaft of the motor/generator, the controller comprising an integrated electronic control unit (ECU) for controlling the engine, the motor/generator, and the gear shift, the controller is configured to:

at the time a vehicle is started by causing the motor/generator to be in charge of a reaction force of the output torque of the engine and transmitting the output torque of the engine to driving wheels via the differential device and the sub-transmission, slip control the automatic clutch in a semi-engaged state.

2. The controller of the hybrid system according to claim 1, wherein the controller is further configured to, at the time a charge prohibition condition of a rechargeable battery is established, start the vehicle by transmitting the output torque of the engine and output torque of the motor/generator while the motor/generator is providing power to drive the driving wheels and while the automatic clutch is slip controlled in the semi-engaged state.

3. The controller of the hybrid system according to claim 2, wherein the controller is further configured to, at a time a gear shift stage of the main-transmission is switched, switch a power transmission path from a previous gear shift stage before shifting gears of the main-transmission to another gear pair for shifting gears in the sub-transmission by causing the motor/generator to be in charge of the reaction force of the output torque of the engine, and the controller is further configured to, at a time a gear shift is carried out by connecting the main-transmission to a requested gear shift stage after the main-transmission has been controlled to a neutral state and a rotation number of the engine has been controlled by a rotation number control of the motor/generator, if an output of the motor/generator exceeds an output restriction of the rechargeable battery, reduce the output torque of the engine by increasing a number of rotations of the motor/generator.

4. The controller of the hybrid system according to claim 1, wherein the controller is further configured to carry out a start control, which is carried out using the differential device and the sub-transmission as a power transmission path while controlling slip of the automatic clutch, at a time a discharge prohibition condition of a rechargeable battery is established, whereas at a time the charge prohibition condition of the rechargeable battery is established, the vehicle is started by transmitting the output torque of the engine and an output torque of the motor/generator while the motor/generator is providing power to drive the driving wheels and while controlling slip of the automatic clutch in the semi-engaged state, and the controller is further configured to establish, at the time neither the charge prohibition condition nor the discharge prohibition condition of the rechargeable battery is established and the rechargeable battery can be charged and discharged, a load of the automatic clutch in the start control during the charge prohibition condition and the controller is further configured to compare the established load with a load of the automatic clutch in the start control at the time the discharge prohibition condition is established, and the start control is carried out based on the smaller load of the established load and the automatic clutch load.

5. The controller of the hybrid system according to claim 4, wherein the controller is further configured to, at a time a gear shift stage of the main-transmission is switched, a second power transmission path is switched from a previous gear shift stage before shifting gears of the main-transmission to another gear pair for shifting gears in the sub-transmission by causing the motor/generator to be in charge of the reaction force of the output torque of the engine, and the controller is further configured to, at a time a gear shift is carried out by connecting the main-transmission to a requested gear shift stage after the main-transmission has been controlled to a neutral state and a rotation number of the engine has been controlled by a rotation number control of the motor/generator, if an output of the motor/generator exceeds an output restriction of the rechargeable battery, reduce the output torque of the engine by increasing a number of rotations of the motor/generator.

6. The controller of the hybrid system according to claim 1, wherein the controller is further configured to, at a time a gear shift stage of the main-transmission is switched, switch a power transmission path from a previous gear shift stage before shifting gears of the main-transmission to another gear pair for shifting gears in the sub-transmission by causing the motor/generator to be in charge of the reaction force of the output torque of the engine, and the controller is further configured to, at the time the gear shift is carried out by connecting the main-transmission to a requested gear shift stage after the main-transmission has been controlled to a neutral state and a rotation number of the engine has been controlled by a rotation number control of the motor/generator, if an output of the motor/generator exceeds an output restriction of the rechargeable battery, reduce the output torque of the engine by increasing a number of rotations of the motor/generator.

* * * * *